US010454606B2

(12) United States Patent
Xue et al.

(10) Patent No.: US 10,454,606 B2
(45) Date of Patent: Oct. 22, 2019

(54) METHOD FOR OPERATING IOT IN CELLULAR SYSTEM AND SYSTEM THEREFOR

(71) Applicant: Samsung Electronics Co., Ltd., Suwon-si, Gyeonggi-do (KR)

(72) Inventors: Peng Xue, Suwon-si (KR); Nam-Jeong Lee, Suwon-si (KR); Cheol Jeong, Seongnam-si (KR); Hyun-Seok Ryu, Yongin-si (KR); Jeong-Ho Park, Seoul (KR); Sung-Ho Chae, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/743,760

(22) PCT Filed: Jul. 22, 2016

(86) PCT No.: PCT/KR2016/008060
§ 371 (c)(1),
(2) Date: Jan. 11, 2018

(87) PCT Pub. No.: WO2017/014602
PCT Pub. Date: Jan. 26, 2017

(65) Prior Publication Data
US 2018/0241495 A1 Aug. 23, 2018

Related U.S. Application Data

(60) Provisional application No. 62/195,571, filed on Jul. 22, 2015, provisional application No. 62/232,840, (Continued)

(51) Int. Cl.
H04J 11/00 (2006.01)
H04W 56/00 (2009.01)
(Continued)

(52) U.S. Cl.
CPC .......... *H04J 11/0083* (2013.01); *H04J 11/00* (2013.01); *H04L 5/0044* (2013.01);
(Continued)

(58) Field of Classification Search
CPC .... H04J 11/00; H04J 11/0083; H04J 11/0073; H04J 11/0076; H04J 11/0079;
(Continued)

(56) References Cited

U.S. PATENT DOCUMENTS 9,179,409 B2* 11/2015 Gupta ............... H04W 52/0219
9,363,819 B2* 6/2016 Wang .................... H04W 72/04
(Continued)

FOREIGN PATENT DOCUMENTS

CN 104106231 A 10/2014

OTHER PUBLICATIONS

Sony; Communication Resource Allocation Mode Capability and Resource Pool Signaling Implications; 3GPP TSG-RAN WG2 Meeting #87bis; R2-144396; Oct. 6-10, 2014; Shanghai, CN.
(Continued)

Primary Examiner — Man U Phan
(74) Attorney, Agent, or Firm — Jefferson IP Law, LLP

(57) ABSTRACT

The present disclosure relates to a 5G or pre-5G communication system for supporting a higher data transmission rate beyond a 4G communication system such as LTE. The present disclosure provides a method for supporting a device performing narrow band Internet of things (IoT) communication by a base station in a cellular system, the method comprising the operations of: transmitting a synchronization sequence for synchronization between the base station and the device performing the narrow IoT communication; transmitting system information including a two-bit mode indication field which indicates an operation mode for performing the narrow IoT communication, the operation (Continued)

corresponding to one of a plurality of operation modes; and transmitting a control channel and a data channel on the basis of parameters for the narrow band IoT communication, the parameter being included in the system information, wherein the operation modes include at least one of a standalone mode, a guard-band mode, an in-band mode in which the cellular system and the narrow band IoT communication use a common cell ID, or an in-band mode in which the cellular system and the narrow band IoT communication use different cell IDs.

20 Claims, 28 Drawing Sheets

Related U.S. Application Data filed on Sep. 25, 2015, provisional application No. 62/251,378, filed on Nov. 5, 2015, provisional application No. 62/291,246, filed on Feb. 4, 2016, provisional application No. 62/307,818, filed on Mar. 14, 2016.

(51) Int. Cl.
*H04L 5/00* (2006.01)
*H04W 4/70* (2018.01)

(52) U.S. Cl.
CPC .......... *H04L 5/0053* (2013.01); *H04L 5/0091* (2013.01); *H04W 4/70* (2018.02); *H04W 56/00* (2013.01); *H04J 11/0073* (2013.01); *H04J 11/0076* (2013.01); *H04J 11/0079* (2013.01)

(58) Field of Classification Search
CPC ...... H04W 56/00; H04W 4/70; H04L 5/0044; H04L 5/0053; H04L 5/0091
USPC .......................................... 370/328
See application file for complete search history.

(56) References Cited

U.S. PATENT DOCUMENTS

| | | | |
|---|---|---|---|
| 9,654,902 B2* | 5/2017 | Oh | H04W 4/70 |
| 9,860,678 B2* | 1/2018 | Oh | H04W 4/70 |
| 9,906,991 B1* | 2/2018 | Peddiraju | H04W 76/28 |
| 10,237,862 B2* | 3/2019 | Shin | H04W 56/0015 |
| 2009/0262710 A1* | 10/2009 | Doi | H04W 56/001 370/336 |
| 2012/0281658 A1 | 11/2012 | Rikkinen et al. | |
| 2014/0029568 A1 | 1/2014 | Wang et al. | |
| 2014/0153417 A1 | 6/2014 | Gupta et al. | |
| 2015/0009927 A1 | 1/2015 | Larsson et al. | |
| 2016/0330378 A1* | 11/2016 | Tsuchiya | G03B 17/14 |
| 2017/0094621 A1* | 3/2017 | Xu | H04W 56/001 |
| 2017/0180095 A1* | 6/2017 | Xue | H04L 5/0048 |
| 2017/0187499 A1* | 6/2017 | Hwang | H04L 5/0051 |
| 2017/0208592 A1* | 7/2017 | Rico Alvarino | H04W 4/70 |
| 2017/0251455 A1* | 8/2017 | Shin | H04W 56/0015 |
| 2017/0373900 A1* | 12/2017 | Adhikary | H04L 5/0048 |
| 2018/0212698 A1* | 7/2018 | Sun | H04L 5/0053 |
| 2018/0324017 A1* | 11/2018 | Liu | H04L 5/0053 |
| 2019/0044690 A1* | 2/2019 | Yi | H04L 5/14 |
| 2019/0045452 A1* | 2/2019 | Yang | H04W 52/24 |
| 2019/0053061 A1* | 2/2019 | Sui | H04W 72/0446 |
| 2019/0053140 A1* | 2/2019 | Wong | H04L 67/12 |

OTHER PUBLICATIONS

Chinese Office Action with English Translation dated Oct. 24, 2018; Chinese Appln. No. 201680042853.9.
Huawei; "NB M2M—System Information Broadcasting for Cellular IoT", 3GPP TSG GERAN #64; Nov. 17-21, 2014; San Francisco, USA; GP-140853.
Huawei; "System information broadcasting for Cellular IoT", 3GPP TSG GERAN #63; Aug. 25-29, 2014; Ljubljana, Slovenia; GP-140570.
Huawei; "Evaluations on narrow-band M2M", 3GPP TSG GERAN #62; May 26-30, 2014; Valencia, Spain; GP-140323.

* cited by examiner

Normal CP

Normal CP

Extended CP
In-Band Mode

Extended CP
Guard Band/Standalone Mode

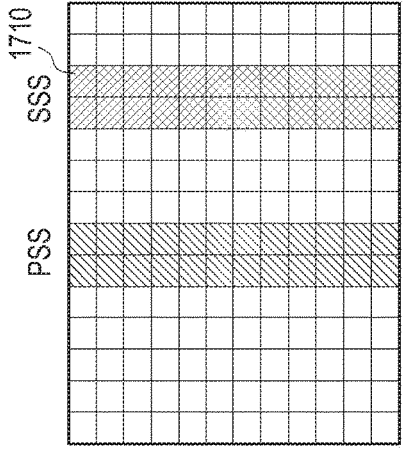
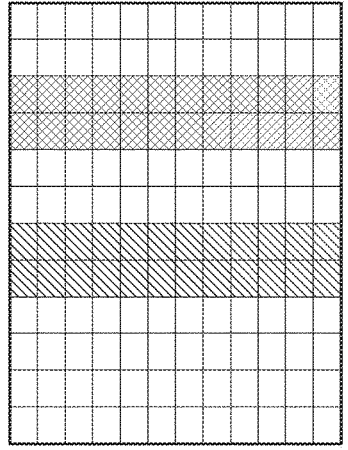
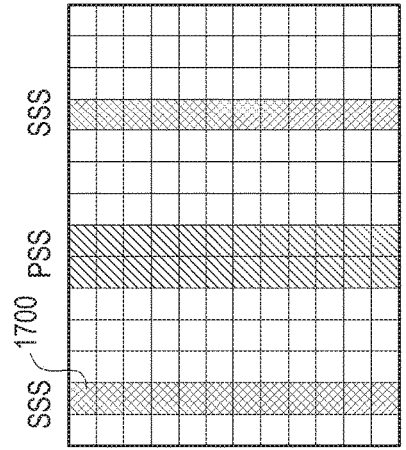
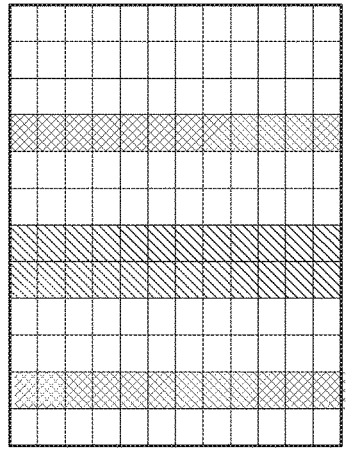
FIG.17A  Normal CP
FIG.17B  Extended CP / In-Band Mode
FIG.17C  Normal CP
FIG.17D  Extended CP / Guard Band/Standalone Mode 1
FIG.17E  Normal CP
FIG.17F  Extended CP / Guard Band/Standalone Mode 2

METHOD FOR OPERATING IOT IN CELLULAR SYSTEM AND SYSTEM THEREFOR

CROSS-REFERENCE TO RELATED APPLICATION(S)

This application is a U.S. National Stage application under 35 U.S.C. § 371 of an International Application No. PCT/KR2016/008060, which was filed on Jul. 22, 2016, and claims a priority to U.S. Provisional Patent Application No. 62/195,571, which was filed on Jul. 22, 2015, U.S. Provisional Patent Application No. 62/232,840, which was filed on Sep. 25, 2015, U.S. Provisional Patent Application No. 62/251,378, which was filed on Nov. 5, 2015, U.S. Provisional Patent Application No. 62/291,246, which was filed on Feb. 4, 2016, and U.S. Provisional Patent Application No. 62/307,818, which was filed on Mar. 14, 2016, the contents of which are incorporated herein by reference.

TECHNICAL FIELD

The present disclosure relates to an operation technique for Internet of things (IoT) communication in a cellular system, and more particularly, to a technique of indicating an IoT operation mode.

BACKGROUND ART

To satisfy the growing demands for wireless data traffic since commercialization of a 4th generation (4G) communication system, efforts have been made to develop an improved $5^{th}$ generation (5G) or pre-5G communication system. That is why the 5G or pre-5G communication system is called a beyond 4G network communication system or a post long term evolution (post LTE) system.

To achieve high data rates, deployment of the 5G communication system in a millimeter wave (mmWave) band (for example, 60 GHz) is under consideration. In order to mitigate propagation path loss and increase a propagation distance in the mmWave band, beamforming, massive multiple input multiple output (massive MIMO), full dimensional MIMO (FD-MIMO), array antenna, analog beamforming, and large-scale antenna technology have been discussed for the 5G communication system.

Further, to improve a system network, techniques such as evolved small cell, advanced small cell, cloud radio access network (cloud RAN), ultra-dense network, device-to-device (D2D) communication, wireless backhaul, moving network, cooperative communication, coordinated multi-point (CoMP), and interference cancellation have been developed for the 5G communication system.

Besides, advanced coding modulation (ACM) techniques such as hybrid FSK and QAM modulation (FQAM) and sliding window superposition coding (SWSC), and advanced access techniques such as filter bank multi carrier (FBMC) and non-orthogonal multiple access (NOMA), and sparse code multiple access (SCMA) have been developed for the 5G communication system.

One significant feature of a cellular Internet of things (CIoT) network is that the CIoT network requires enhanced coverage to enable machine type communication (MTC). For example, one typical scenario of a CIoT service is to provide water metering or gas metering over a cellular network.

Most MTC/CIoT systems target at low-end applications which may be appropriately managed by global system for mobile communication (GSM)/general packet radio service (GPRS) due to excellent coverage and low device cost of the GSM/GPRS. However, as more and more CIoT devices have been deployed in a real environment, the dependency on a GSM/GPRS network has been increasing. Further, some CIoT system targets at a standalone deployment scenario through re-farming of a GSM carrier having a band of 200 KHz.

As LTE deployment has been developed, network operators seek to reduce overall network maintenance cost by reducing the number of radio access technologies (RATs). MCT/CIoT is a market expected to be continuously boosted in the future. MTC/CIoT may cause cost to an operator and may not bring a maximum profit from a frequency spectrum, because a plurality of RATs should be maintained in MTC/CIoT. Considering that the number of MTC/CIoT devices is highly likely to increase, total resources required for the MTC/CIoT devices to provide services will increase accordingly and will be allocated inefficiently. Therefore, there is a need for a new solution for migrating MTC/CIoT devices from a GSM/GPRS network to an LTE network.

DETAILED DESCRIPTION OF THE INVENTION

Technical Problem

An aspect of the present disclosure is to provide a new machine type communication (MTC)/cellular Internet of things (CIoT) system which may be flexibly deployed in various manners, such as standalone deployment, deployment in a guard band of a legacy cellular system (for example, long term evolution (LTE)), or deployment within a bandwidth of the legacy cellular system.

Technical Solution

In an aspect of the present invention, a method for supporting narrow band Internet of things (IoT) communication of a device by a base station in a cellular system includes transmitting a synchronization sequence for synchronization between the device performing the narrow band IoT communication and the base station, transmitting system information including a 2-bit mode indication field indicating an operation mode for the narrow band IoT communication, the operation mode corresponding to one of a plurality of operations modes, and transmitting a control channel and a data channel based on a parameter for the narrow band IoT communication, the parameter being included in the system information. The operation modes include a standalone mode, a guard-band mode, an in-band mode using a common cell identifier (ID) for the cellular system and the narrow band IoT communication, and an in-band mode using different cell IDs for the cellular system and the narrow band IoT communication.

In another aspect of the present disclosure, a method for performing narrow band IoT communication by a device in a cellular system includes receiving a synchronization sequence for synchronization between the device and a base station of the cellular system, receiving system information including a 2-bit mode indication field indicating an operation mode for the narrow band IoT communication, the operation mode corresponding to one of a plurality of operations modes, and receiving a control channel and a data channel based on a parameter for the narrow band IoT communication, the parameter being included in the system information. The operation modes include a standalone mode, a guard-band mode, an in-band mode using a common cell ID for the cellular system and the narrow band IoT communication, and an in-band mode using different cell IDs for the cellular system and the narrow band IoT communication.

In another aspect of the present disclosure, a base station for supporting narrow band IoT communication of a device in a cellular system includes a controller for controlling transmission of a synchronization sequence for synchronization between the device performing the narrow band IoT communication and the base station, transmission of system information including a 2-bit mode indication field indicating an operation mode for the narrow band IoT communication, the operation mode corresponding to one of a plurality of operations modes, and transmission of a control channel and a data channel based on a parameter for the narrow band IoT communication, the parameter being included in the system information, and a transceiver for transmitting the synchronization sequence, the system information, the control channel, and the data channel under the control of the controller. The operation modes include a standalone mode, a guard-band mode, an in-band mode using a common cell ID for the cellular system and the narrow band IoT communication, and an in-band mode using different cell IDs for the cellular system and the narrow band IoT communication.

In another aspect of the present disclosure, a device for performing narrow band IoT communication in a cellular system includes a controller for controlling reception of a synchronization sequence for synchronization between the device and a base station of the cellular system, reception of system information including a 2-bit mode indication field indicating an operation mode for the narrow band IoT communication, the operation mode corresponding to one of a plurality of operations modes, and reception of a control channel and a data channel based on a parameter for the narrow band IoT communication, the parameter being included in the system information, and a transceiver for receiving the synchronization sequence, the system information, the control channel, and the data channel under the control of the controller. The operation modes include a standalone mode, a guard-band mode, an in-band mode using a common cell ID for the cellular system and the narrow band IoT communication, and an in-band mode using different cell IDs for the cellular system and the narrow band IoT communication.

Advantageous Effects

Considering that various operation modes are supported for cellular Internet of things (CIoT), the methods for indicating a mode according to the present disclosure enable a CIoT system to identify a CIoT operation mode as fast as possible and perform an appropriate subsequent process.

Resource utilization and frequency diversity may be increased by allocating a plurality of physical resource blocks (PRBs) to a narrow band-Internet of things (NB-IoT) system.

BRIEF DESCRIPTION OF THE DRAWINGS

FIG. 17 is an exemplary view illustrating a method for distinguishing different operation modes from each other in terms of the positions and density of PSS/SSS symbols;

MODE FOR CARRYING OUT THE INVENTION

Embodiments of the present disclosure will be described below in detail with reference to the attached drawings. A detailed description of a generally known function or structure of the present disclosure will be avoided lest it should obscure the subject matter of the present disclosure. Although the terms used in the present disclosure are defined in consideration of functions in the embodiments of the present disclosure, the terms may be changed according to the intention of a user or an operator, or customs. Therefore, the present disclosure should be understood, not simply by the actual terms used but by the meanings of each term lying within.

Before a detailed description of the present disclosure, some terms used in the present disclosure may be interpreted as, but not limited to, the following meanings.

A base station is an entity communicating with a terminal, which may be referred to as a BS, a Node B (NB), an eNode B (eNB), an access point (AP), or the like.

A device is an entity communicating with a BS, which may be referred to as a narrow band-Internet of things (NB-IoT) device, a user equipment (UE), a mobile station (MS), a mobile equipment (ME), a terminal, or the like.

CIoT represents cellular IoT and may also be referred to as NB-IoT, NB-CIoT, or narrow band-long term evolution (NB-LTE).

While the following description will be given in the context of an NB-IoT system, by way of example, the embodiments of the present disclosure are not limited to the NB-IoT system. Thus, the embodiments of the present disclosure are also applicable to a 5th generation (5G) enhanced mobile broadband (eMBB) system or a massive machine type communication (mMTC) system. Further, while an LIE system is taken as a legacy system, the present disclosure is also applicable to other cellular systems, not limited to the LTE system.

A. NB-IoT System Deployment Scenarios

An NB-IoT system occupies a narrow bandwidth. For example, the NB-IoT system may use a minimum system bandwidth of 200 kHz (or 180 kHz) for both downlink (DL) and uplink (UL). Due to occupation of a narrow bandwidth, the NB-IoT system may be deployed standalone, in a guard band of a legacy cellular system (for example, an LTE system), or within a system bandwidth of the legacy cellular system.

FIG. 1 is an exemplary view illustrating various deployment scenarios of the NB-IoT system.

Figure 1A:
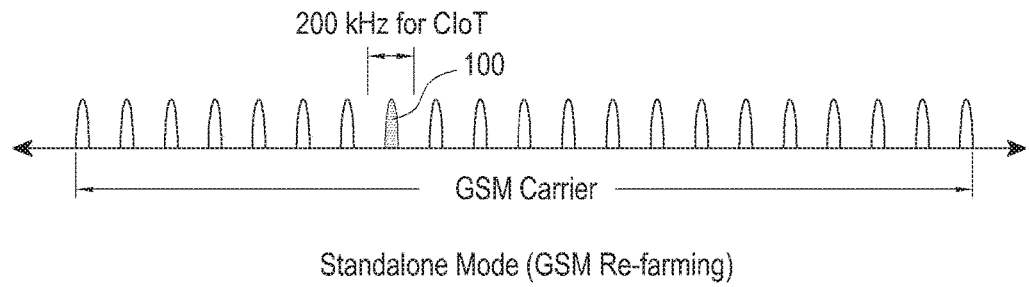
FIG. 1 is an exemplary view illustrating various deployment scenarios of a narrow band-Internet of things (NB-IoT) system.

Referring to FIG. 1(a), the NB-IoT system may be deployed in a standalone mode. For example, the NB-IoT system may be deployed in the standalone mode by re-farming a global system for mobile communication (GSM) carrier 100 having a bandwidth of 200 kHz (re-farming means re-use for another communication service).

Figure 1B:
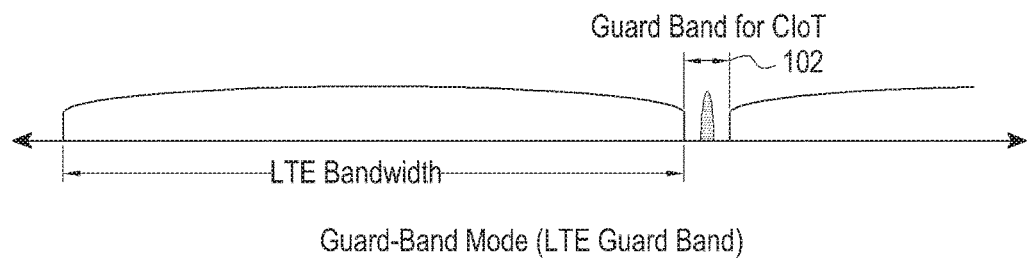

Referring to FIG. 1(b), the LTE system may have a guard band of 200 kHz to 2 MHz (according to its system bandwidth), and the NB-IoT system may be deployed in a guard band region 102 of the LTE system. The operation mode of the NB-IoT system deployed in the guard band region 102 may be referred to as a guard-band mode.

Figure 1C:
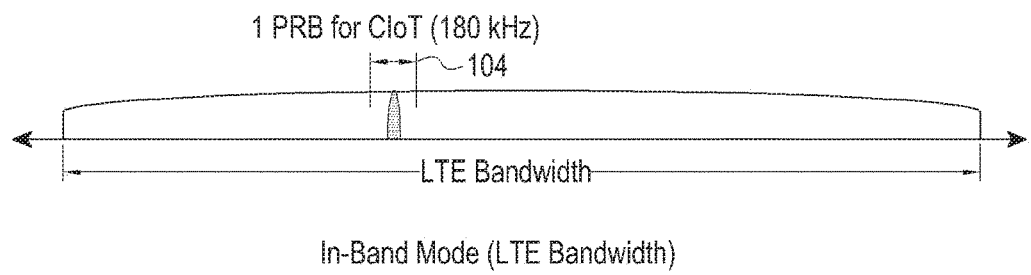

Referring to FIG. 1(c), since the bandwidth of a physical resource block (PRB) is 180 kHz in the LTE system, the NB-IoT system may be deployed in any PRB 104 within a total bandwidth. The operation mode of the NB-IoT system deployed in the PRB 104 within the LTE bandwidth may be referred to as an in-band mode.

Further, in order to provide a scalable (adjustable) capacity, it is also possible to allocate a plurality of PRBs to the NB-IoT system. This is favorable in terms of resource utilization and frequency diversity. Frequency hopping across a plurality of PRBs may further provide interference randomization and offer sufficiently separated PRBs and an increased diversity gain. Particularly, an operation using a plurality of PRBs is preferable for the in-band mode. It is because the DL transmission power of the NB-IoT system may be shared with a legacy system (for example, an LTE system), and resources occupied by a legacy control channel (for example, a physical downlink control channel (PDCCH)) or a reference signal (RS) (for example, cell-specific reference signal (CRS)) will not be used by NB-IoT.

B. Time/Frequency Resource Structure of NB-IoT System

FIG. 2 is an exemplary view illustrating a resource grid corresponding to one subframe in an NB-IoT system.

Figure 2A:
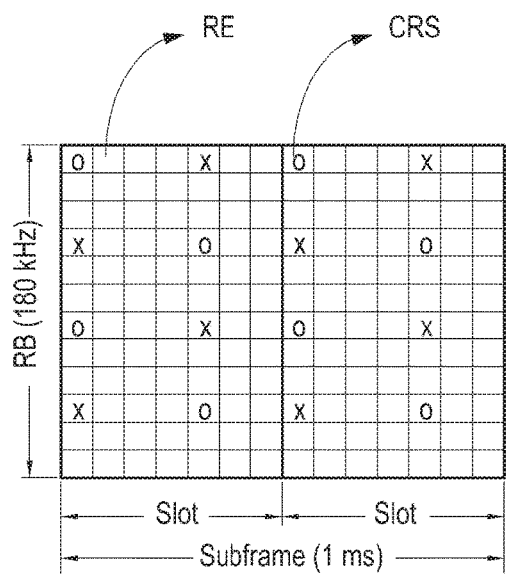
FIG. 2 is an exemplary view illustrating a resource grid corresponding to one subframe in an NB-IoT system.
Figure 2B:
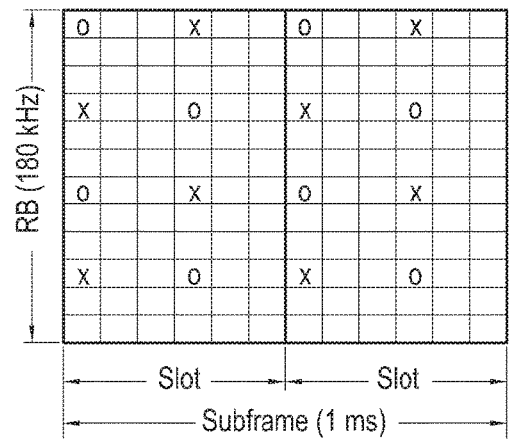

An NB-IoT system supporting the in-band mode should be designed in consideration of co-existence and compatibility with the legacy LTE system. To avoid negative effects on the legacy LTE system, as many LTE parameters (for example, a waveform and a subcarrier spacing) as possible may be reused for the NB-IoT system. In FIG. 2, the resource grid of one PRB during one subframe in the NB-IoT system is shown, by way of example. As illustrated in FIG. 2, the resource grid of the NB-IoT system may be identical to a resource grid of the LTE system. FIG. 2(a) illustrates a resource grid in a normal cyclic prefix (CP) case, and FIG. 2(b) illustrates a resource grid in an extended CP case.

Figure 3:
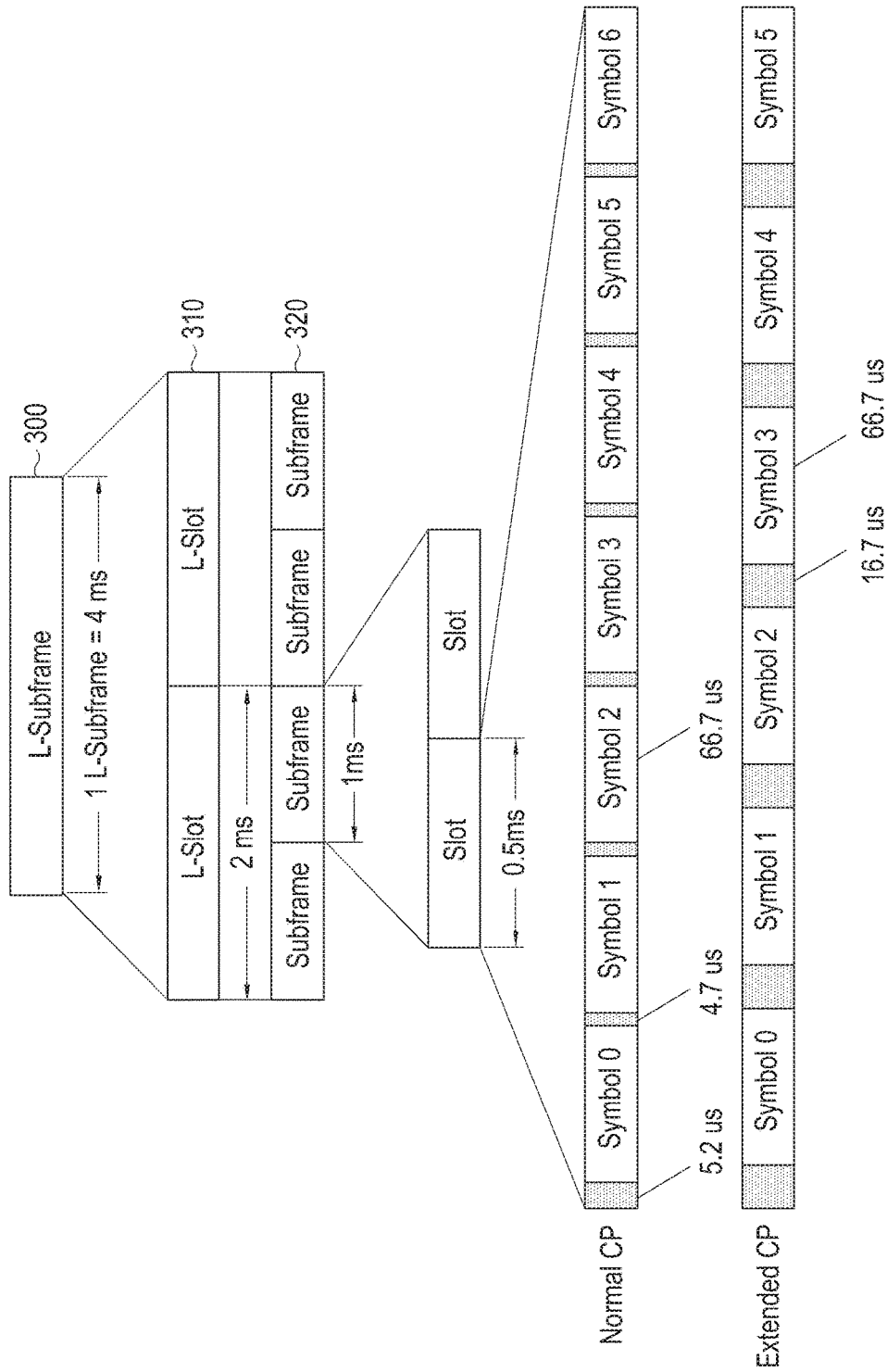
FIG. 3 is an exemplary view illustrating the structure of an L-subframe in the NB-IoT system.

FIG. 3 is an exemplary view illustrating the structure of an L-subframe in the NB-IoT system.

A more detailed time domain structure for the NB-IoT system is illustrated in FIG. 3. In the case where only one PRB is used, a longer subframe unit 300 (for example, an L-subframe including four subframes 320 (4 ms)) may be defined as a minimum scheduling unit. If a shorter scheduling unit than the L-subframe 300 is required, a longer slot 310 (for example, a 2-ms L-slot) may be considered.

Figure 4:
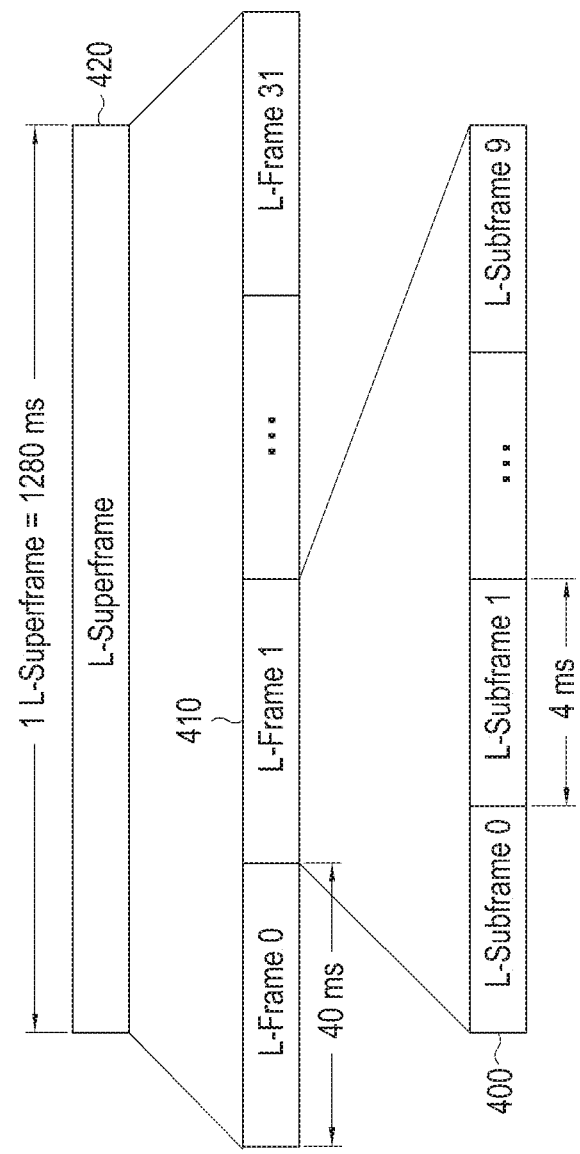
FIG. 4 is an exemplary view illustrating the structure of an L-superframe in the NB-IoT system.

FIG. 4 is an exemplary view illustrating the structure of an L-superframe in the NB-IoT system.

Similarly, a 40-ms L-frame 410 including 10 L-subframes 400 may be defined. The duration of the L-frame 410 may be matched to the transmission time interval (TTI) of a physical broadcast channel (PBCH) of the LTE system. One PBCH is transmitted repeatedly 4 times during 40 ms. One L-super frame 420 may include 32 L-frames 410 and have a duration of 1280 ms.

Figure 5:
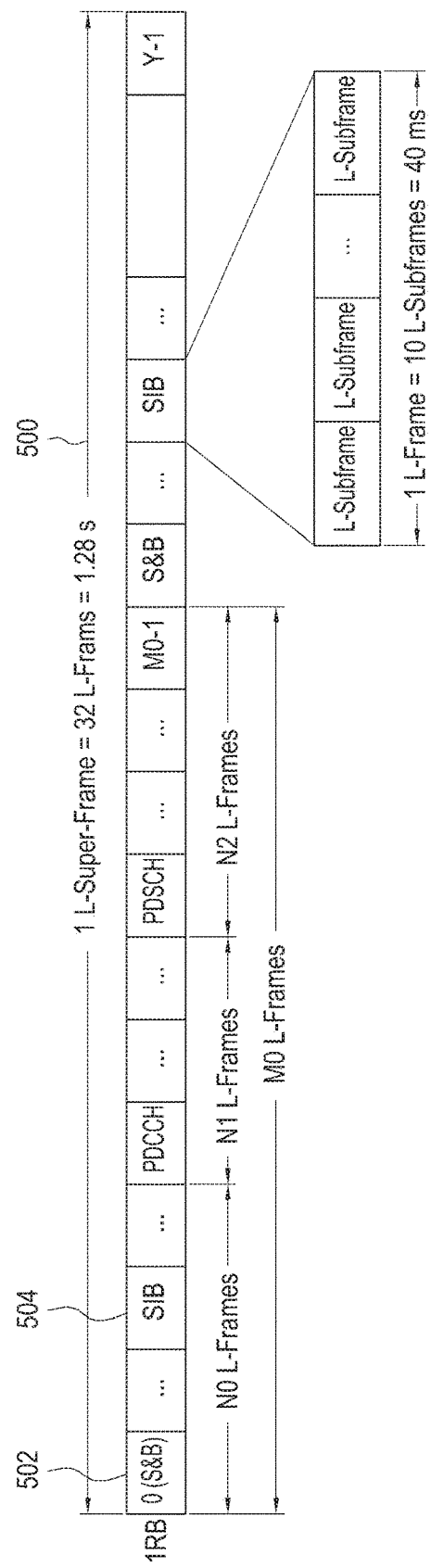
FIG. 5 is an exemplary view illustrating the structure of a downlink time domain in the NB-IoT system.
Figure 6A:
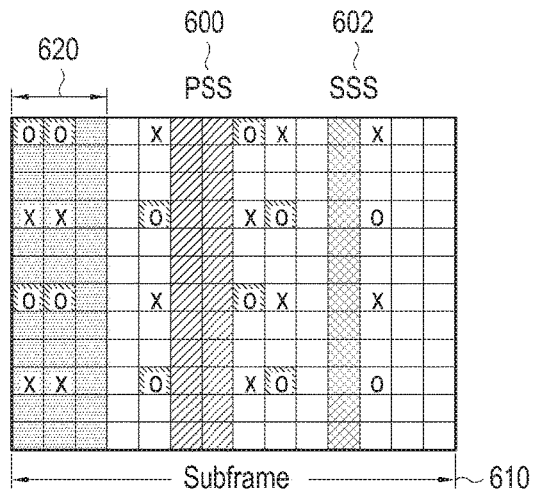
FIG. 6 is an exemplary view illustrating primary synchronization signal (PSS)/secondary synchronization signal (SSS) transmissions in the NB-IoT system.
Figure 6C:
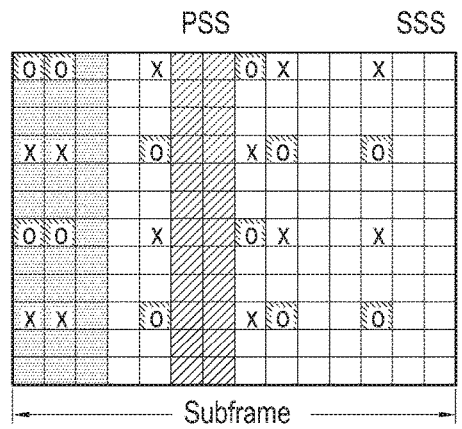
Figure 6B:
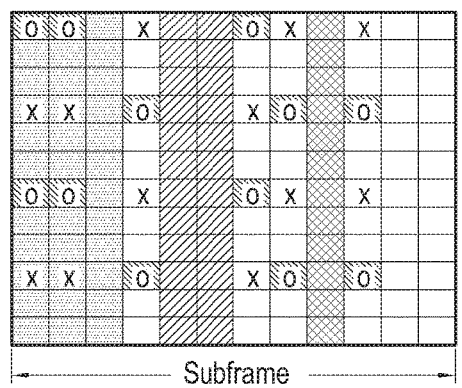
Figure 6D:
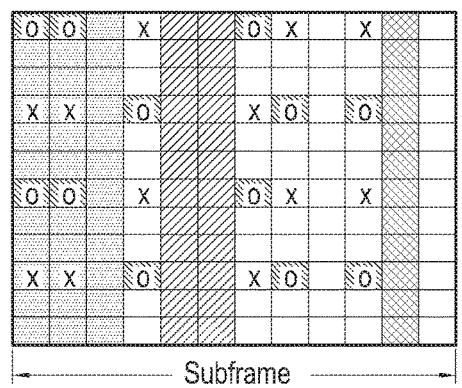

FIG. 5 is an exemplary view illustrating the structure of a DL time domain in the NB-IoT system.

Referring to FIG. 5, transmission channels are arranged in time division multiplexing (TDM). A synchronization sequence and broadcast information (for example, system information such as a master information block (MIB)) may be transmitted together at the beginning 502 of an L-super-frame 500. In general, the synchronization sequence may include a primary synchronization sequence (PSS) and a secondary synchronization sequence (SSS). The MIB may include a limited amount of system information. The remaining system information which is not included in the MIB may be transmitted in a system information block (SIB) 504. According to coverage requirements, the MIB frame 502 and the SIB frame 504 may be transmitted repeatedly.

FIG. 6 is an exemplary view illustrating PSS/SSS transmissions in the NB-IoT system.

In the case where only one PRB is used in the NB-IoT system, a PSS and/or SSS may be repeated (transmitted) in one subframe in order to increase the detection performance of a synchronization sequence. Similarly to the LTE system, an NB-IoT device may acquire basic system information, for example, a frame timing, a CP length (normal CP or extended CP), a frequency division duplex (FDD) mode or a time division duplex (TDD) mode, and a cell identifier (ID), by detecting the PSS/SSS. As illustrated in FIG. 6, since a PSS 600 and an SSS 602 are positioned in different symbols of a subframe 610, a CP length and an FDD/TDD mode may be derived after successful PSS/SSS detection. FIG. 6(*a*) is an exemplary view illustrating a PSS/SSS transmission in the FDD mode in the normal CP case, FIG. 6(*b*) is an exemplary view illustrating a PSS/SSS transmission in the FDD mode in the extended CP case, FIG. 6(*c*) is an exemplary view illustrating a PSS/SSS transmission in the TDD mode in the normal CP case, and FIG. 6(*d*) is an exemplary view illustrating a PSS/SSS transmission in the TDD mode in the extended CP case.

In the NB-IoT in-band mode, it is necessary to avoid a symbol occupied by an RS (for example, a CRS 630) and a symbol occupied by a control channel (for example, a PDCCH 620) for the PSS/SSS.

Figure 7A:
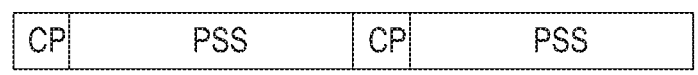
FIG. 7 is an exemplary view illustrating PSS transmissions in the NB-IoT system.
Figure 7B:
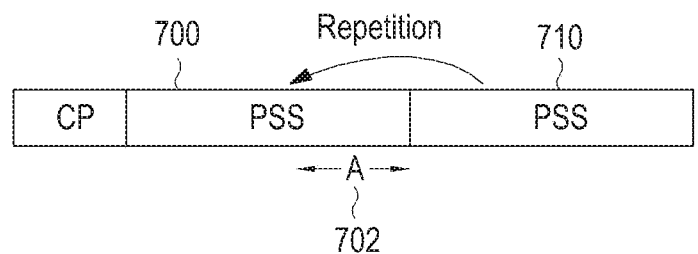
Figure 8A:
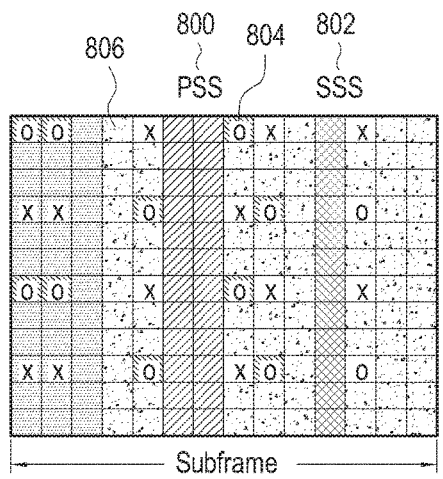
FIG. 8 is an exemplary view illustrating physical broadcast channel (PBCH) transmissions in the NB-IoT system.
Figure 8C:
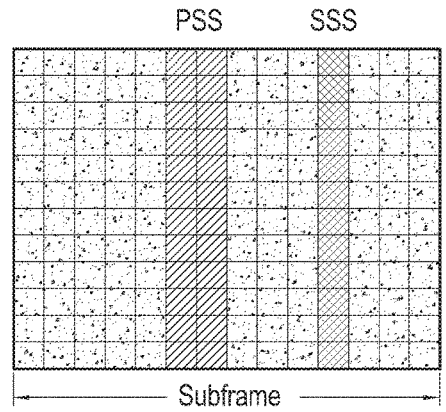
Figure 8B:
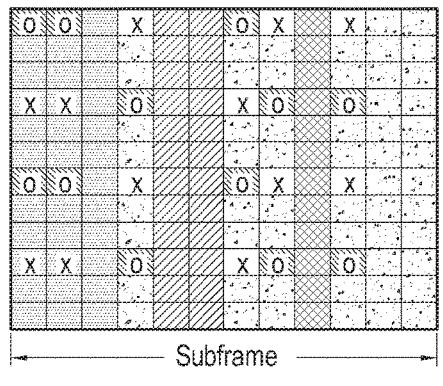
Figure 8D:
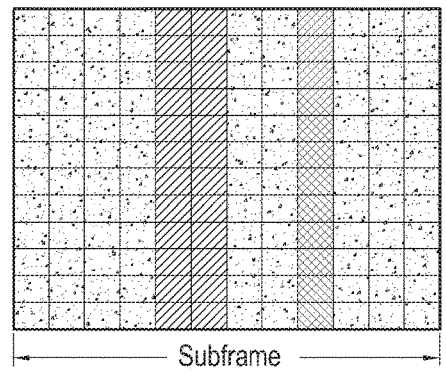

FIG. 7 is an exemplary view illustrating PSS transmissions in the NB-IoT system.

Referring to FIG. 7(*a*), PSS detection performance may be improved by arranging two successive symbols for a PSS transmission.

Referring to FIG. 7(*b*), since a PSS signal is repeated directly, an 'A' part 702 of a PSS symbol 700 may be considered as a virtual CP of the next PSS symbol 710. In this case, the PSS may be detected irrespective of a used CP length (that is, normal CP or extended CP). Further, symbol-level correction is possible. This symbol-level correction may reduce the PSS detection complexity of a receiver.

FIG. 8 is an exemplary view illustrating PBCH transmissions in the NB-IoT system.

FIG. 8(*a*) illustrates resource element (RE) mapping in the in-band mode in the normal CP case, FIG. 8(*b*) illustrates RE mapping in the in-band mode in the extended CP case, FIG. 8(*c*) illustrates RE mapping in the guard-band/standalone mode in the normal CP case, and FIG. 8(*d*) illustrates RE mapping in the guard-band/standalone mode in the extended CP case. System information such as a PBCH (MIB and/or SIB) and a PSS/SSS may be transmitted in the same subframe because a PSS 800 and an SSS 802 will not use all symbols in the subframe. The PSS 800 and the SSS 802 may be used for channel estimation for decoding of the PBCH.

Referring to FIGS. 8(*a*) and 8(*b*), REs (for example, 806) not occupied by the PSS 800/SSS 802 in a subframe may be used for PBCH transmission in the in-band mode. On the contrary, REs (for example, 804) occupied by CRSs may not be used for RE mapping for a PBCH in the in-band mode.

Referring to FIGS. 8(*c*) and 8(*d*), CRSs are not transmitted in the guard-band mode or standalone mode. Accordingly, all REs except for PSS/SSS symbols are available for a PBCH.

In the NB-IoT in-band mode, the NB-IoT system and the LTE system may share the power of a BS for DL transmission. Power boosting for a signal or transmission channel (for example, a PSS/SSS, an MIB, an SIB, or a PDCCH) may be considered to enhance the coverage performance of an in-band mode NB-IoT system.

Figure 9:
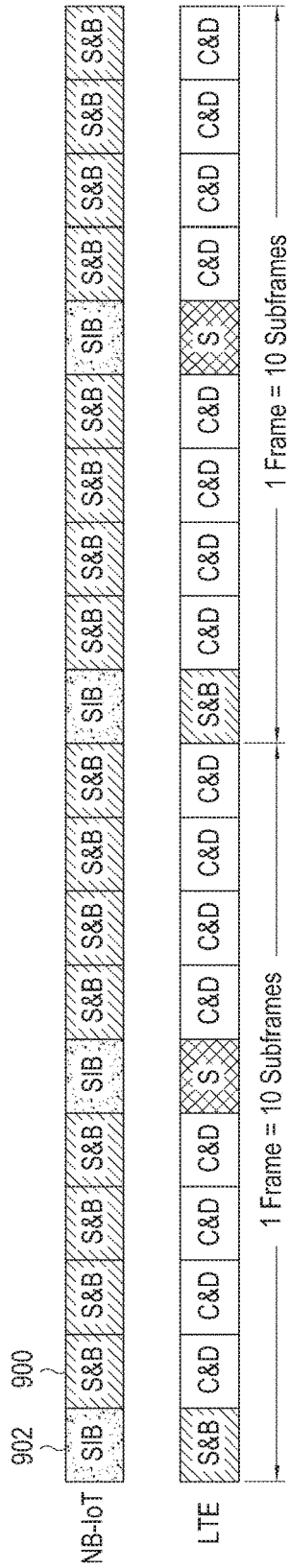
FIG. 9 is an exemplary view illustrating a primary synchronization signal (PSS)/secondary synchronization signal (SS S)/master information block (MIB) transmission of the NB-IoT system in the time domain, in a manner that avoids collision with a PSS/SSS/MIB transmission of a legacy system.

FIG. 9 is an exemplary view illustrating a PSS/SSS/MIB transmission of the NB-IoT system in the time domain, in a manner that avoids collision with a PSS/SSS/MIB transmission of a legacy system.

It is also possible to design a PSS/SSS/MIB transmission of the NB-IoT system in a manner that avoids a PSS/SSS/MIB transmission of the LTE system as much as possible. For example, as illustrated in FIG. 9, S&B subframes 900 carrying an NB-IoT PSS/SSS/MIB and SIB subframes 902 may be distributed appropriately. Alternatively, the NB-IoT PSS/SSS/MIB transmission subframes 900 may be so designed as to avoid collision with LTE PSS/SSS/MIB symbols as much as possible. For example, unlike the LTE system, a PSS/SSS may be arranged in the last symbol of each subframe 600.

Figure 10:
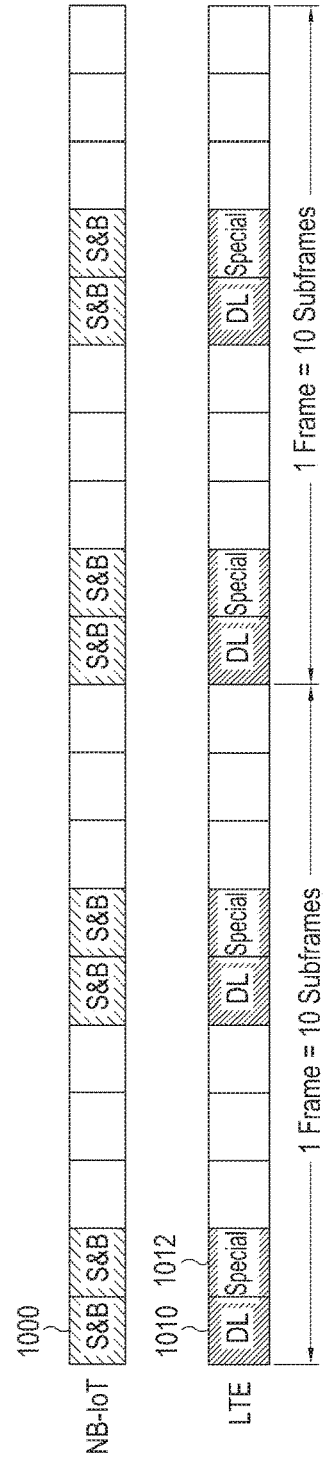
FIG. 10 is an exemplary view illustrating an NB-IoT PSS/SSS/MIB transmission in a long term evolution time division duplex (LTE TDD) system.

FIG. 10 is an exemplary view illustrating an NB-IoT PSS/SSS/MIB transmission in an LTE TDD system.

As illustrated in FIG. 10, an NB-IoT PSS/SSS/MIB 1000 may be so designed as to be transmitted only in a DL subframe 1010 or a special subframe 1012 in the LTE TDD system. After accessing the LTE system and acquiring a TDD UL/DL configuration, an NB-IoT device may acquire usages of other frames. Further, a control channel (for example, a PDCCH) and a data channel (for example, a physical downlink shared channel (PDSCH)) of NB-IoT may be configured to occupy only the DL subframe 1010 in LIE TDD.

Figure 11:
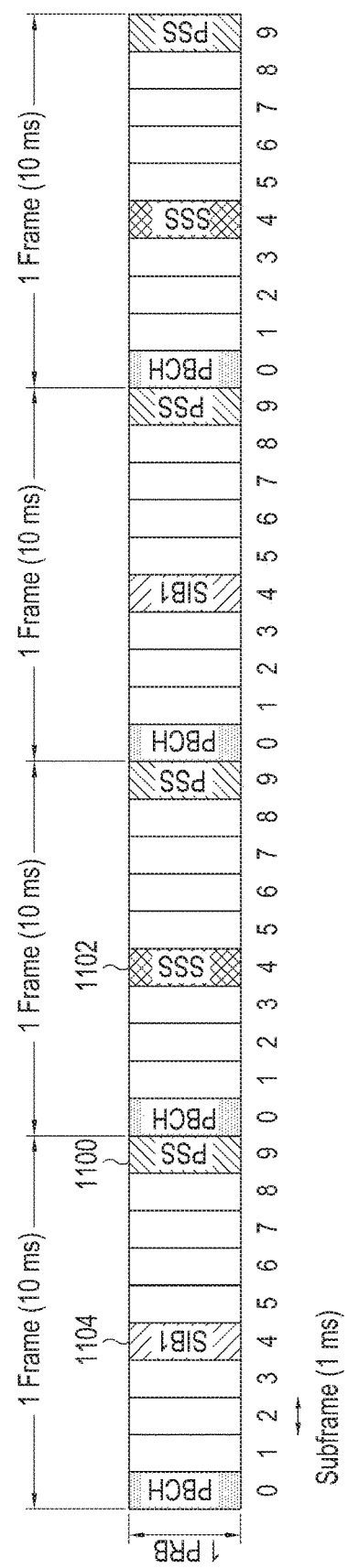
FIG. 11 is an exemplary view illustrating an alternative downlink frame structure in the time domain in the NB-IoT system.

FIG. 11 is an exemplary view illustrating an alternative DL frame structure in the time domain in the NB-IoT system.

For more feasible implementation of the in-band mode, the DL frame structure of the NB-IoT system may be matched to the DL frame structure of the L 1E system. Considering the in-band mode, the DL frame structure of the NB-IoT system mainly seeks not to affect legacy LTE UEs. Therefore, some REs need to be protected so that an NB-IoT device may not use the REs.

Accordingly, it is useful to allocate a PSS/SSS and a PBCH to resources that do not collide with a legacy LTE signal. A PSS, an SSS, and an M-PBCH of the NB-IoT system are arranged in a manner that avoids collision with a CRS, a positioning reference signal (PRS), a PSS, an SSS, a PDCCH, a physical control format indicator channel (PCFICH), a physical hybrid-ARQ indicator channel (PHICH), and a multicast broadcast single frequency network (MBSFN) of the LTE system. For example, the LTE MBSFN may occur in subframes 1, 2, 3, 6, 7 and 8. Herein, subframes 0, 4, 5 and 9 may be considered as the positions of the NB-IoT PSS/SSS and PBCH.

As illustrated in FIG. 11, the frame structure of the NB-IoT system is identical to that of the LTE system. The PSS of the NB-IoT system may be positioned in subframe 9 1100 and repeated every 10 ms in order to prevent potential collision with the LIE MBSFN. The SSS may be positioned in subframe 4 1102 and repeated every 20 ms. The PBCH may be positioned in subframe 0 1104 and repeated every 10 ms. If there are dedicated resources for transmission of SIB1, SIB1 may be positioned in subframe 4 1104 that is not occupied by the SSS. Considering the afore-described rules to avoid collision with a legacy LTE signal or channel, it is obvious that other positions are also available. The remaining resources except for resources used for transmission of the PSS, SSS, and SIB1 may be shared by a control channel (for example, a PDCCH) or a data channel (for example, a PDSCH).

C. Deployment of In-Band Mode or Guard-band Mode NB-IoT System

In an in-band mode NB-IoT system scenario, any PRB may be used basically for an operation of the NB-IoT system. It may be assumed that an NB-IoT device has only information about the center frequency of the L 1E system, without bandwidth information. For the NB-IoT system operation, the following options for PRB configuration may be considered.

FIG. 12 is an exemplary view illustrating PRB access methods in an in-band mode NB-IoT system.

Exemplary in-band mode NB-IoT PRB access methods are illustrated in FIG. 12. Herein, the positions of NB-IoT PRBs to be accessed are applicable only to DL PRBs. UL PRB information may be signaled by DL broadcast information or control information.

Figure 12A:
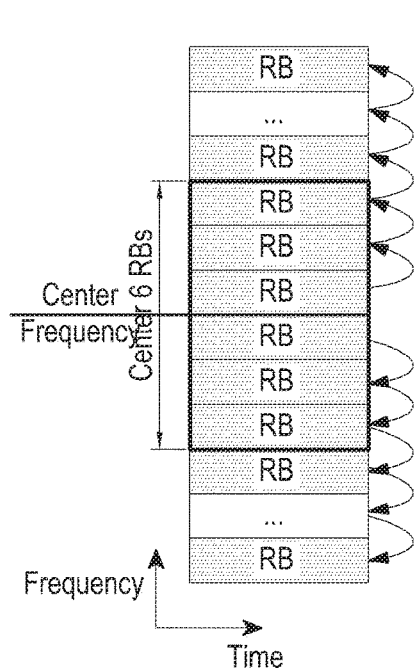
FIG. 12 is an exemplary view illustrating physical resource block (PRB) access methods in an in-band mode NB-IoT system.

Option 1:

Referring to FIG. 12(a), all PRBs (including center 6 RBs) may be candidate PRBs for operation of the NB-IoT system. An NB-IoT device may blind-detect an NB-IoT signal in all possible PRBs (for example, PRBs within an LTE bandwidth including up to 110 RBs in the in-band mode).

Figure 12B:
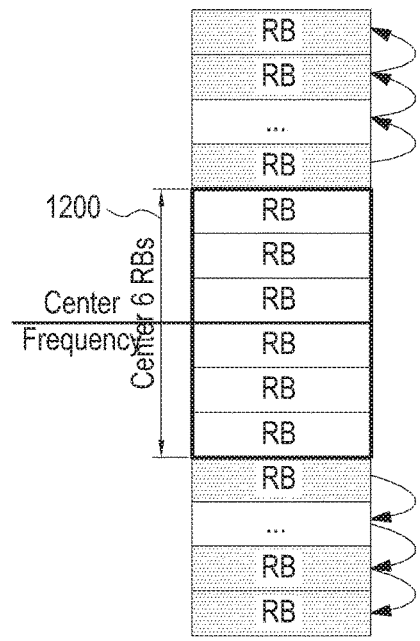

Option 2:

Referring to FIG. 12(b), all PRBs except for center 6 PRBs 1200 may be candidate PRBs for operation of the NB-IoT system. Since a legacy LTE synchronization signal and broadcast channel are transmitted in the center 6 PRBs 1200, it may be preferable to exclude the center 6 PRBs from NB-IoT candidate PRBs. Otherwise, the NB-IoT system should be designed in consideration of avoidance of collision with a legacy L E signal.

Since Option 1 and Option 2 impose almost no constraint on candidate PRBs for operation of the NB-IoT system, they require a very large blind search process for detection of an NB-IoT signal. Therefore, it may be better to pre-configure limited PRB sets for possible operations of the NB-IoT system.

Figure 12C:
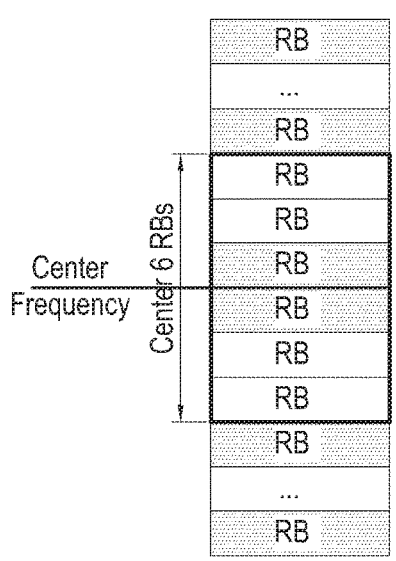

Option 3:

Referring to FIG. 12(c), a pre-configured candidate PRB set for the NB-IoT system may be defined based on a PRB index offset related to a center PRB. The index offset is equivalent to the frequency offset of an LTE center frequency, for example, $\{a_0, a_1, \ldots, a_N\}$. Even though there is no limit regarding exclusion of a specific PRB from a candidate PRB set, the candidate PRB set may be defined in consideration of an LTE system bandwidth and system requirements. Because different (or various) bandwidths are available to the LTE system, candidate PRBs need to be defined for the different bandwidths.

Unlike Option 1 and Option 2, there may be a rule of selecting an appropriate candidate PRB in the case of different LTE bandwidths in Option 3. For example, edge PRBs (PRBs located at edges) 1210 and 1212 in a given LTE system bandwidth may be considered for the NB-IoT system usage. Selectively, the center 6 PRBs may be excluded in Option 3, as in Option 2. The NB-IoT device may blind-detect an NB-IoT signal in these selected PRBs.

In the above options, a PRB may be an in-band PRB in a wide system bandwidth, but a guard-band PRB in a narrow system bandwidth. The NB-IoT device may behave differently in detecting an NB-IoT signal depending on an in-band PRB or a guard-band PRB. Therefore, additional mode differentiation, that is, in-band mode or guard-band mode identification is needed.

Option 4:

In view of the presence of a plurality of bandwidth options for the LTE system, an NB-IoT device may take a long time to perform the NB-IoT PRB blind detection procedure. Therefore, blind detection may be performed for a shorter time by designing a 2-step access procedure.

Figure 12D:
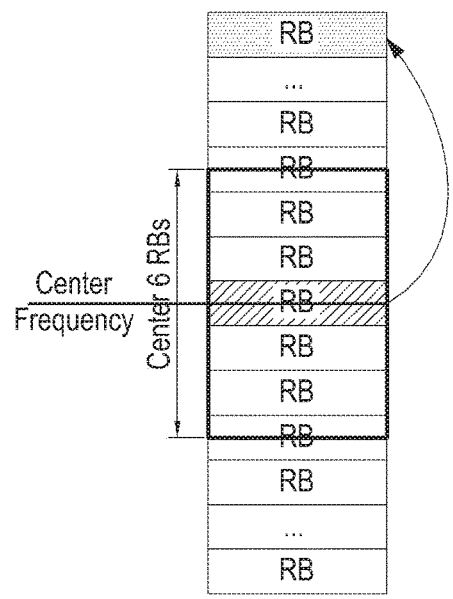

Referring to FIG. 12(d), the NB-IoT device accesses a predefined very limited set of PRBs 1220 (for example, one or two PRBs) in a first step. The PRB 1220 of step 1 may carry an NB-IoT synchronization signal and/or broadcast information, and may be called an anchor PRB. The PRB 1220 may provide additional information about an in-band or guard-band NB-IoT system in the current LTE system/cell. Alternatively, a PRB in a guard band may be used as the anchor PRB. A PRB index for the in-band/guard-ban NB-IoT system in the LTE system (or LTE cell) may be transmitted by a synchronization signal or broadcast information in the anchor PRB. The additional information (for example, a cell ID, a system frame number (SFN), a bandwidth (BW), and so on) may be included in the anchor PRB to help a device to access in the in-band or guard-band mode.

In a second step, the NB-IoT device may access an NB-IoT PRB 1222 using the PRB index of the NB-IoT system and the additional information, which are acquired from the anchor PRB, and operate in the in-band mode/guard-band mode.

Figure 13:
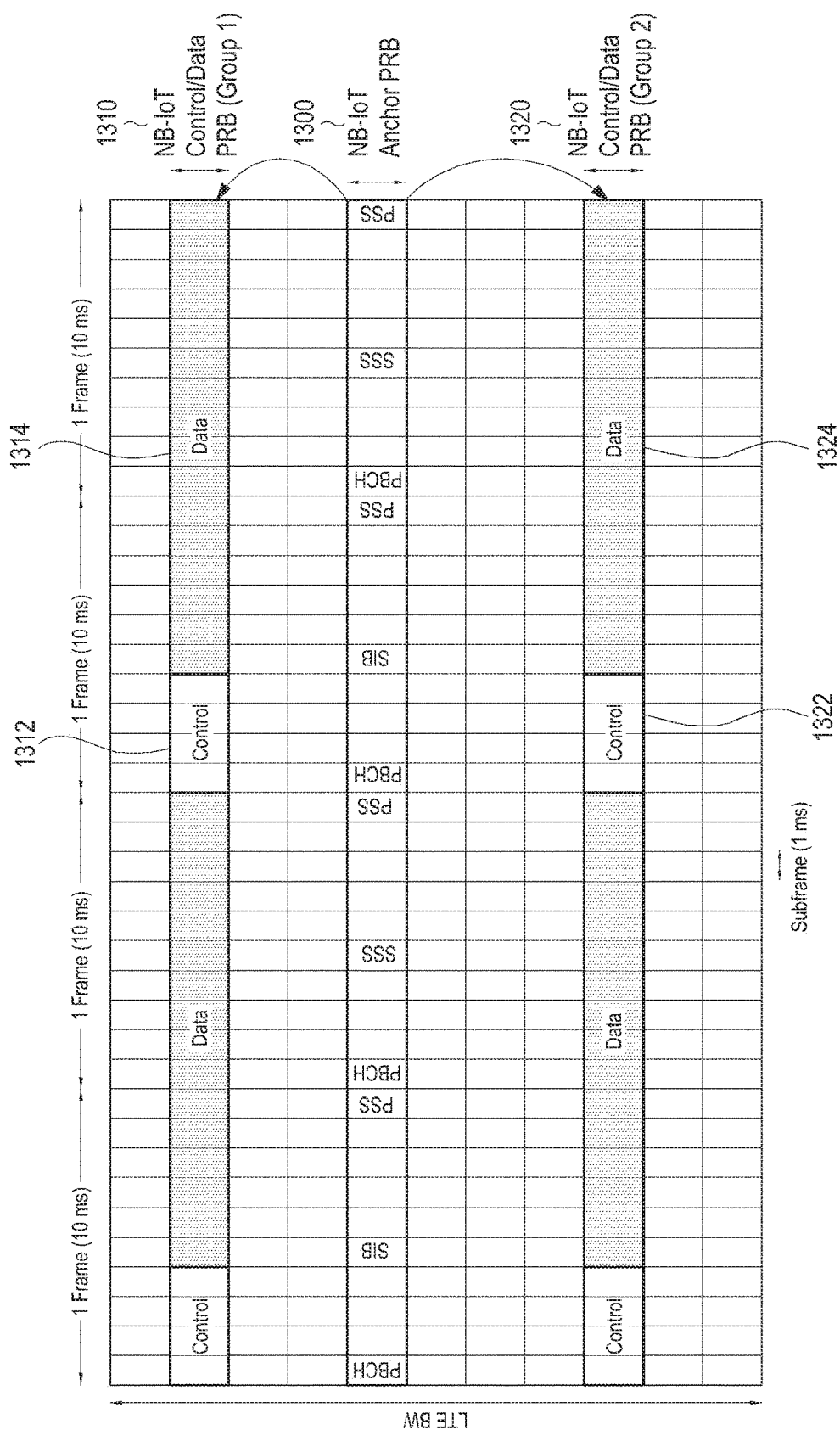
FIG. 13 is an exemplary view illustrating use of a plurality of PRBs in the in-band mode NB-IoT system.

FIG. 13 is an exemplary view illustrating use of a plurality of PRBs in the in-band mode NB-IoT system.

A more specific example is illustrated in FIG. 13. A common anchor PRB 1300 may be used to deliver a synchronization signal and broadcast information (an MIB and an SIB). A PRB index for a control channel and a data channel may be indicated by the common anchor PRB 1300. If there are a plurality of PRBs for the data channel and the data channel, UEs may be divided into different groups 1310 and 1320 in a predetermined rule, and the UEs of the same group access the same control channel PRB/data channel PRB. For example, the UEs of group 1 1310 may access a control channel PRB 1312 and a data channel PRB 1314 of group 1 1310, and the UEs of group 2 1320 may access a control channel PRB 1322 and a data channel PRB 1324 of group 2 1320. In this manner, a traffic load within a cell may be balanced.

FIG. 14 is an exemplary view illustrating a PRB blind detection method in the NB-IoT system.

Figures 14A, 14B:
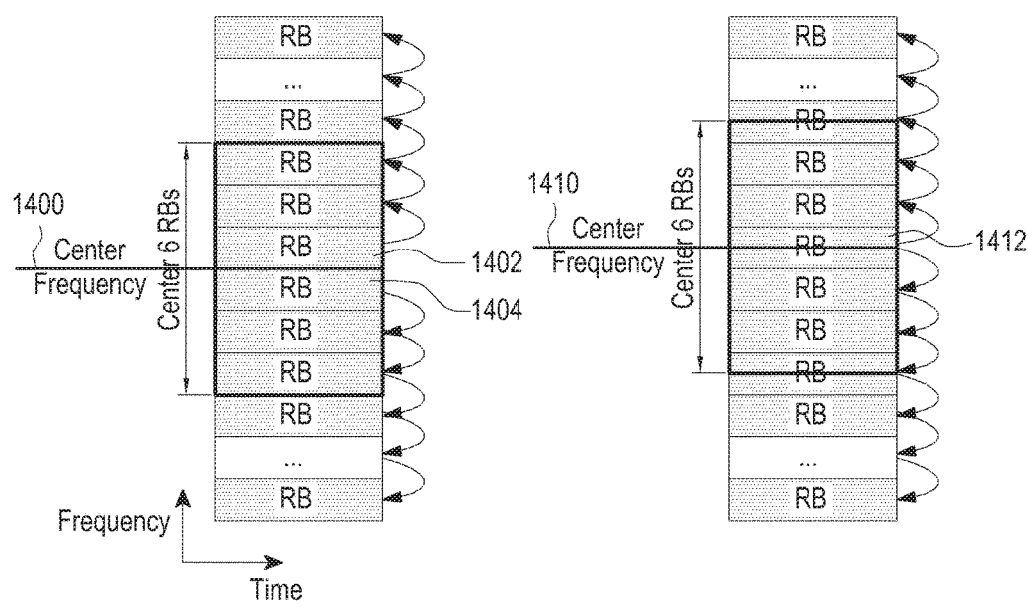
FIG. 14 is an exemplary view illustrating a PRB blind detection method in the NB-IoT system.

The position of a PRB related to a center frequency may be different for a different bandwidth. Accordingly, as illustrated in FIG. 14(a), a center frequency 1400 may be positioned between two PRBs 1402 and 1404, or as illustrated in FIG. 14(b), a center frequency 1410 may be positioned in the middle of one RB 1412. Therefore, two PRB blind detection methods may be considered. The PRB blind detection methods are a detection method having an offset of an integer multiple of a PRB bandwidth, and a detection method having an offset of an integer multiple of a PRB bandwidth and an additional offset of a ½ PRB bandwidth.

Figure 15:
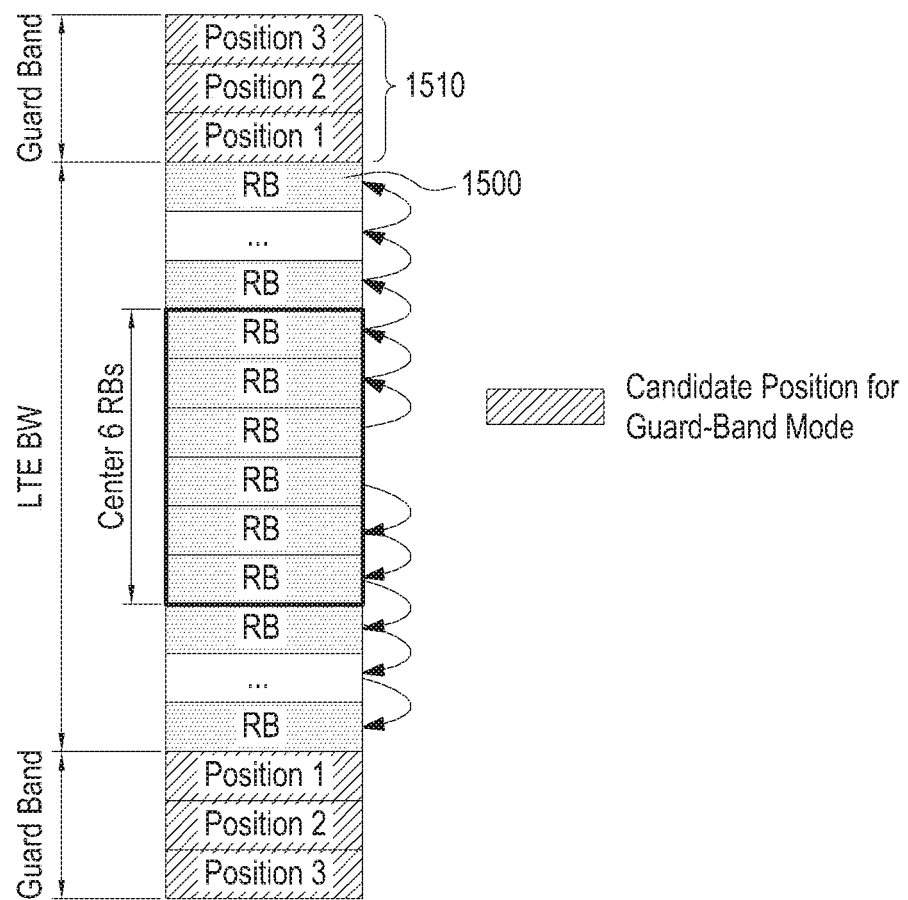
FIG. 15 is an exemplary view illustrating a PRB blind detection method in a guard-band mode NB-IoT system.

FIG. 15 is an exemplary view illustrating a PRB blind detection method in a guard-band mode NB-IoT system.

As described before, some PRB may be an in-band PRB in a wide bandwidth but a guard-band PRB in a narrow bandwidth. As illustrated in FIG. 15, a guard-band mode candidate PRB 1510 may be positioned near to an edge PRB 1500 and have an offset of an integer multiple of 180 kHz.

D. NB-PSS/NB-SSS Design

Figure 16:
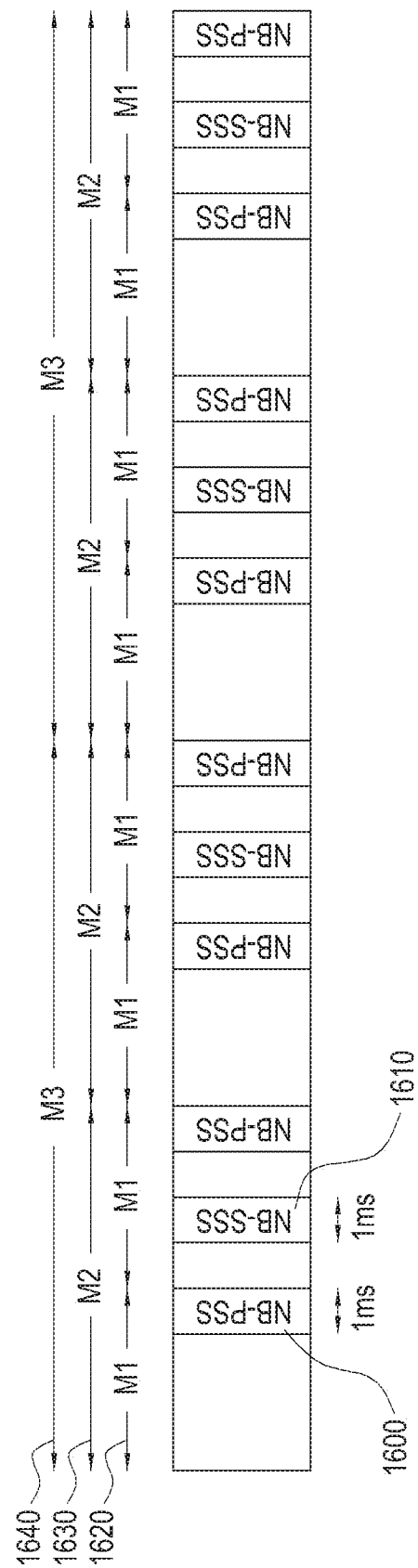
FIG. 16 is an exemplary view illustrating a time synchronization method based on PSS/SSS transmission in the NB-IoT system.

FIG. 16 is an exemplary view illustrating a time synchronization method based on a PSS/SSS transmission in the NB-IoT system.

A narrow band PSS (NB-PSS) (PSS of NB-IoT) and a narrow band SSS (NB-SSS) (SSS of NB-IoT) may be transmitted so that a UE may acquire time/frequency synchronization with a cell. Each of the NB-PSS and NB-SSS may be transmitted at a predefined density for a predetermined period. For example, an NB-PSS 1600 is transmitted in one subframe every M1 subframes (for example, M1=10 or 20), and an NB-SSS 1610 may be transmitted in one subframe every M2 subframes (for example, M2=10, 20 or 40). The boundary of M1 subframes 1620 may be derived by NB-PSS detection, and the boundary of M3 subframes 1640 may be derived by NB-SSS detection. Herein, M3 1640 may be an integer multiple of M2 1630. For example M1=20, M2=40, and M3=80. The boundary of the M3 subframes may be aligned with the boundary of a narrow band PBCH (NB-PBCH: PBCH of NB-IoT), to facilitate detection of the NB-PBCH.

Further, an NB-IoT device may need to acquire other system-specific or cell-specific information by receiving the NB-PSS 1600 and the NB-SSS 1610. Other system-specific or cell-specific information may be, for example, a CP length (when a system supports one or more CP lengths), a physical cell ID (PCID), an FDD mode or TDD mode, and so on. The CP length may be determined by blind detection. The PCID may be acquired by an NB-PSS index and an NB-SSS index. If $N_{Total}^{PSS}$ NB-PSS indexes and $N_{Total}^{SSS}$ NB-SSS indexes exist, $N_{Total}^{PSS} N_{Total}^{SSS}$ indications may exist. For example, if there are two NB-SSS sets, that is, NB-SSS1 and NB-SSS2, a combined indication may be expressed as $N_{Total}^{PSS/SSS} = N_{Total}^{PSS} N_{Total}^{SSS} = N_{Total}^{PSS} N_{Total}^{SSS1} N_{Total}^{SSS2}$.

E. Mode Differentiation or Mode Indication

To support access of the NB-IoT system to various modes, different modes may be distinguished or indicated by the following options.

Option 1:

Synchronization sequences may be used to distinguish different NB-IoT modes from each other. For example, since there are 3 PSS indexes and 168 SSS indexes in the LTE system, a total of 504 (=3×168) cell IDs may be supported. For the NB-IoT system, synchronization sequences may be designed in a similar manner. The numbers of PSS indexes and SSS indexes may be designed based on requirements for the NB-IoT system. Although different combinations of PSS indexes and SSS indexes (equivalent to cell IDs) may be used to indicate PCIDs, they may also be used to distinguish the NB-IoT operation modes from each other, along with PCIDs.

Option 1-1:

Since there are more SSS indexes than PSS indexes, different sets of SSS indexes may be used to distinguish different modes from each other. That is, a special case of extending SSS sets may be considered to support mode indication. For example, SSSs having indexes {0, 1, 2, . . . , 167} may be used to indicate the in-band mode, which corresponds to the use of a set of LTE cell IDs {0, 1, 2, . . . , 503} for the in-band operation mode in the current LTE system. Other sets of SSS indexes may be used to indicate the guard-band mode and the standalone mode. For example, a set of SSS indexes {168, 169, . . . , X} may be used to indicate the guard-band mode and the standalone mode. Herein, X is the largest of SSS indexes for the NB-IoT system. It is to be noted that the same basic SSS may be used for different SSS indexes, and a slight modification may be made to distinguish different SSS indexes from each other.

Option 1-2:

If there are one or more (for example, three) PSS indexes, different PSS indexes may be used to distinguish different modes from each other. Further, SSS indexes may be used to distinguish cells or sectors.

Option 1-3:

If it is assumed that there are 503 PCIDs in the LTE system and 3 NB-IoT operation modes are defined, 1512 indexes may be required to distinguish the PCIDs and operation modes. If only two operation modes (that is, the in-band mode and a non-in-band mode) need to be distinguished from each other, 1008 indexes may be required. The following index configuration may be used for PCIDs and mode indication.

$$N_{ID}^{PSS/SSS} = N_{Total}^{Mode} N_{ID}^{Cell,NB\text{-}IoT} + N_{ID}^{Mode}$$

Herein, $N_{ID}^{PSS/SSS} \leq N_{Total}^{PSS/SSS}$. That is, the number of NB-PSS indexes and NB-SSS indexes used to indicate modes, $N_{ID}^{PSS/SSS}$ is less than the total number of possible combinations of NB-PSS indexes and NB-SSS indexes.

Examples of supporting indication of 2 or 3 modes will be described. A method for supporting indication of more modes may be extended in a similar manner.

EXAMPLE 1

If there are 504 PCIDs and 2-mode indication (in-band mode and non-in-band mode, that is, $N_{Total}^{Mode}=2$) is supported, $N_{ID}^{PSS/SSS}=2N_{ID}^{Cell,NB\text{-}IoT}+N_{ID}^{Mode}$ where $N_{ID}^{Cell,NB\text{-}IoT} \in [0,503]$ and $N_{ID}^{Mode} \in [0,1]$.

EXAMPLE 2

If there are 504 PCIDs and 3-mode indication (in-band mode, guard band mode, or standalone mode, that is, $N_{Total}^{Mode}=3$) is supported, $N_{ID}^{PSS/SSS}=3N_{ID}^{Cell,NB\text{-}IoT}+N_{ID}^{Mode}$ where $N_{ID}^{Cell,NB\text{-}IoT} \in [0,503]$ and $N_{ID}^{Mode} \in [0,2]$.

Option 2:

In the NB-IoT in-band operation mode, symbols of a control channel (for example, LTE PDCCH symbols) and symbols occupied by RSs (for example, CRS symbols) may not be used for an NB-PSS/NB-SSS transmission. However, this limitation is not imposed on the NB-IoT guard-band mode and standalone mode because the NB-IoT guard-band mode and standalone mode use a band unused by the legacy system. Accordingly, an NB-IoT operation mode may be indicated by the density or position of a transmitted PSS/SSS. Herein, a PSS/SSS density may refer to the ratio of RE(s) occupied for transmission of a PSS/SSS in a unit resource area (for example, one PRB).

FIG. 17 is an exemplary view illustrating a method for distinguishing different operation modes from each other in terms of the positions and density of PSS/SSS symbols.

Option 2-1:

The PSS/SSS density in one subframe may be higher in the guard-band mode or standalone mode (see FIGS. 17(c) and 17(e)) than in the in-band mode (see FIG. 17(a)). That is, more symbols may be transmitted for a PSS/SSS in one subframe in the guard-band mode or standalone mode than in the in-band mode. Because symbol(s) used for a PDCCH in a subframe in the LTE system are not available for the in-band mode, an SSS may be transmitted in the first to third symbols of the subframe, for example, in the guard-band mode or standalone mode. Therefore, if an SSS transmission density is high in one subframe (for example, the SSS transmission density is equal to a PSS transmission density), it may indicate the guard-band mode or standalone mode.

Option 2-2:

A mode may be indicated by a different PSS/SSS position in one subframe. For example, while an SSS is positioned only in a non-CRS symbol in the in-band mode, the SSS may also be positioned in a CRS symbol (for example, 1700 or 1710). Therefore, an SSS positioned in a CRS symbol may indicate the guard-band mode or standalone mode.

Figure 18:
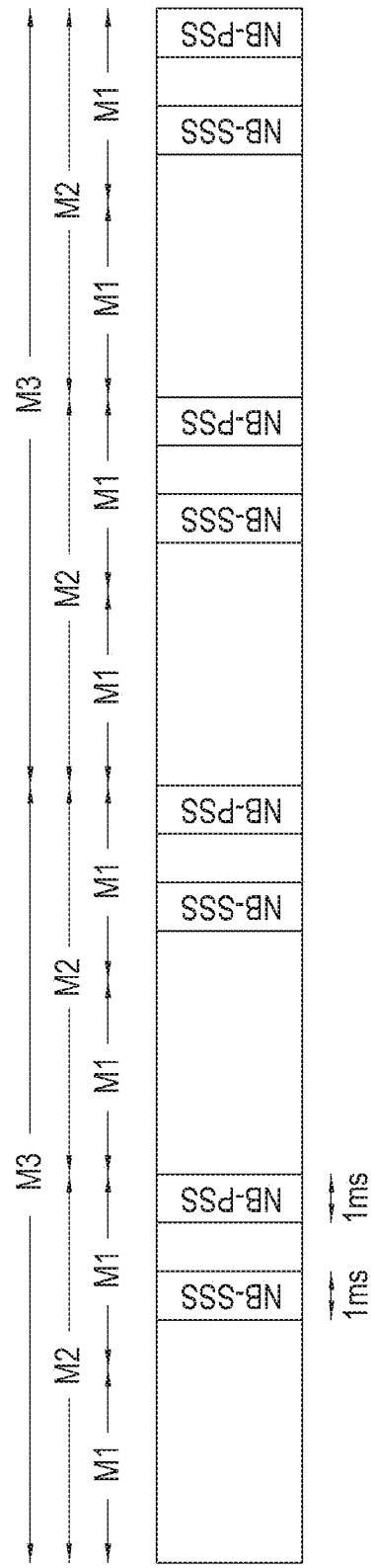
FIG. 18 is an exemplary view illustrating a method for distinguishing different operation modes from each other in terms of the positions and density of PSS/SSS subframes.
Figure 19:
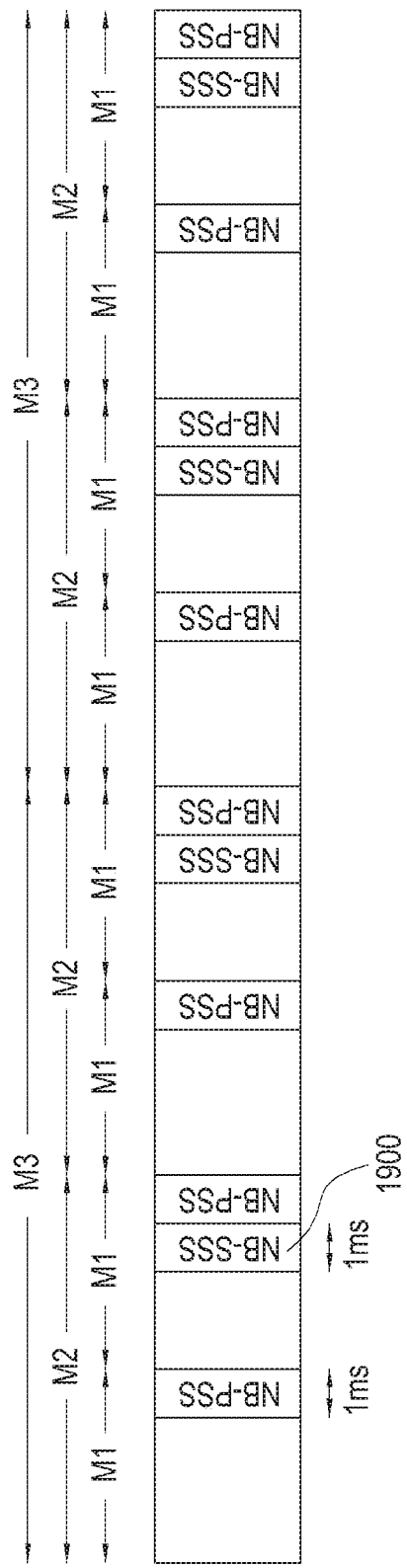
FIG. 19 is an exemplary view illustrating another method for distinguishing different operation modes from each other in terms of the positions and density of PSS/SSS subframes.

FIGS. 18 and 19 are exemplary views illustrating a method for distinguishing different operation modes in terms of the positions and density of PSS/SSS subframes.

Option 2-3:

If a PSS occupies one subframe, an SSS may also occupy one subframe. Thus, it is possible to identify an operation mode based on the densities or positions of a PSS subframe and an SSS subframe. The density of PSS/SSS subframes may refer to the ratio of subframe(s) occupied for transmission of PSS/SSS subframes in a unit period (for example, one frame or one superframe).

Referring to FIGS. 16 and 18, different NB-PSS subframe densities and different NB-SSS subframe densities may be configured to distinguish operation modes. For example, the transmission power of an NB-IoT device may be shared with a legacy LTE eNB in the in-band mode, and thus limited transmission power may be configured for the in-band mode. Due to this limited transmission power, the NB-PSS subframe density and the NB-SSS subframe density may be configured to be high in the in-band operation mode. Compared to the NB-PSS density in FIG. 18, the NB-PSS density is high in FIG. 16. Accordingly, the NB-PSS transmission of FIG. 16 may indicate the in-band mode, whereas the NB-PSS transmission of FIG. 18 may indicate the guard-band mode or standalone mode.

Referring to FIGS. 16 and 19, different positions of NB-PSS subframes and NB-SSS subframes may be configured to distinguish operation modes. There may be a limitation on the transmission positions of an NB-PSS and an NB-SSS in the in-band mode. For example, non-transmission of an NB-SSS in an LTE CRS symbol in FIG. 16 may indicate the in-band mode, whereas transmission of an NB-SSS in an LTE CRS symbol 1900 in FIG. 19 may indicate the guard-band mode or standalone mode.

Option 3:

An NB-IoT operation mode may be explicitly indicated by broadcast information.

Option 3-1:

A 'mode indication' or 'operation mode indication' field in an NB-MIB (MIB of NB-IoT) may be used to indicate an NB-IoT operation mode. For example, if an operation mode indication by an NB-PSS or NB-SSS is not supported, the 'mode indication' field may be added to an NB-MIB transmitted on an NB-PBCH. If the 'mode indication' field is 1 bit, it may indicate whether a mode is the in-band mode or not. If the 'mode indication' field is 2 bits, it may indicate the in-band mode, the guard-band mode, the standalone mode, and reserved.

Figure 20:
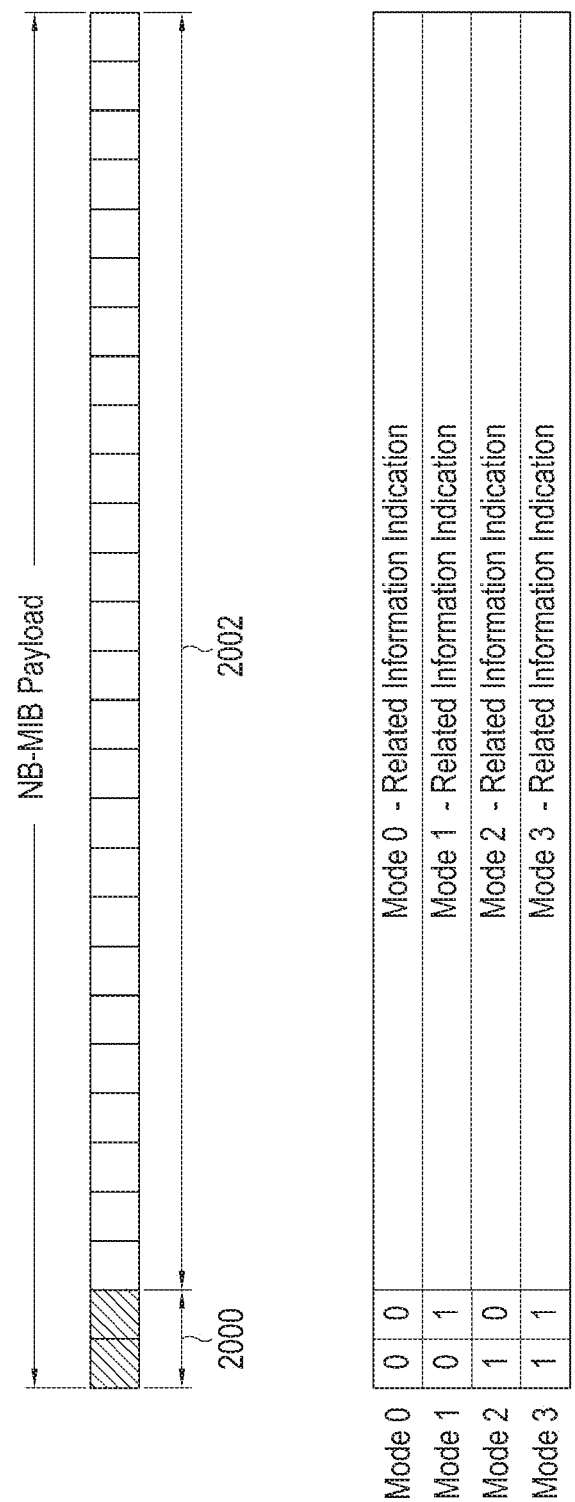
FIG. 20 is an exemplary view illustrating a method for explicitly indicating an NB-IoT mode by MIB payload.

FIG. 20 is an exemplary view illustrating a method for explicitly indicating an NB-IoT mode by MIB payload (K=2).

If an NB-MIB is used to indicate an NB-IoT operation mode, the content or interpretation of the NB-MIB may be different according to the NB-IoT operation mode. For example, predefined K (K>=1) most significant bits (MSBs) 2000 (or least significant bits (LSBs)) may be used to indicate an operation mode, and the content or interpretation of the remaining bits 2002 may be determined according to the operation mode.

Figures 21, 22:
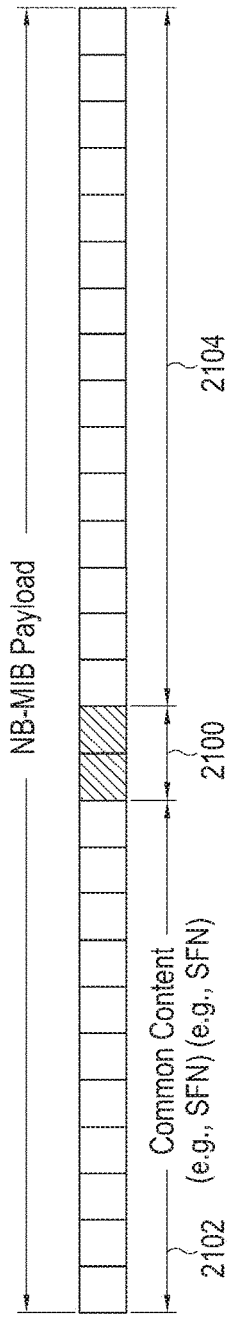
FIG. 21 is an exemplary view illustrating another method for explicitly indicating an NB-IoT mode by MIB payload.
FIG. 22 is an exemplary detailed view illustrating MIB payload for different operation modes.

FIG. 21 is an exemplary view illustrating another method for explicitly indicating an NB-IoT mode by MIB payload (K=2).

As illustrated in FIG. 21, a mode indication field 2100 may be positioned in an LSB (or MSB). Further, it is possible to separate common content 2102 from operation mode-related information 2104.

FIG. 22 illustrates a more specific example of MIB payload for different operation modes.

Referring to FIG. 22, a 'mode indication' field included in MIB payload may indicate one of an in-band (same cell ID or common cell ID) mode, an in-band (different cell ID) mode, the guard-band mode, and the standalone mode. Specifically, the first bit 2200 of the mode indication may be used to indicate whether the operation mode is the in-band mode or not. If the first bit 2200 indicates that the operation mode is not the in-band mode (that is, '0'), the next bit 2202 (that is, the second bit) may be used to indicate the standalone mode or guard-band mode. If the first bit 2200 indicates the in-band mode (that is, '1'), the second bit 2200 may be used to different cases (for example, the cell ID of the NB-IoT system is identical to or different from that of the LTE system). That is, if different cases exist for any operation mode, the different cases may be indicated along with the mode indication. For example, two cases may be supported for the in-band mode according to system requirements and planning. One of the cases is that the NB-IoT system shares the same PCID with the LTE system, and the other case is that the NB-IoT system and the LTE system use different PCIDs. Therefore, these two cases may be distinguished by the mode indication field 2200 and 2202 included in the NB-MIB. If the cell ID (that is, PCID) is shared between the NB-IoT system and the LTE system, CRS-related information may be indicated in the payload of the NB-MIB so that an NB-IoT device may use (or re-use) an LTE CRS for channel estimation.

Option 3-2:

Another field of an MIB or SIB, for example, a 'Number of L 1E PDCCH Symbols' field may be used to indicate a mode. If the value of the Number of LTE PDCCH Symbols field is larger than 0, this may imply that the in-band mode is used, and if the value of the Number of LTE PDCCH Symbols field is 0, this may imply that the guard-band mode or standalone mode is used.

Option 3-3:

Another field of the MIB or SIB, for example, a 'Number of CRS Antenna Ports' field for the legacy LTE system may be used to indicate a mode. A 2-bit Number of CRS Antenna Ports field may indicate 0, 1, 2, and 4 as the numbers of ports. If the number of antenna ports is indicated as 1, 2, or 4, the in-band mode may be indicated, and if the number of antenna ports is indicated as 0, the guard-band mode or standalone mode may be indicated. This approach may be applied to any other field. That is, a 1-bit pattern may be reserved for mode indication.

Option 3-4:

A 1 or more-bit pattern may be reserved to indicate an NB-IoT operation mode in another field of the MIB. For example, if a PRB index is indicated in the MIB by means of a 5-bit pattern, a part of bit patterns may be used to indicate actual PRB indexes, whereas the other bit patterns may be used to indicate standalone or guard-band deployment.

When needed, a 1-bit 'FDD/TDD mode indication' field may be added to the NB-MIB transmitted on the NB-PBCH. Further, an additional bit may be used to indicate FDD mode or TDD mode configurations. For example, a 3-bit 'FDD/TDD mode indication' field may indicate FDD, TDD configuration 0, TDD configuration 1, TDD configuration 2, TDD configuration 3, TDD configuration 4, TDD configuration 5, and TDD configuration 6.

Further, combinations of the above options may be used to indicate a plurality of modes such as an FDD/TDD mode and an NB-IoT operation mode.

Figure 23:
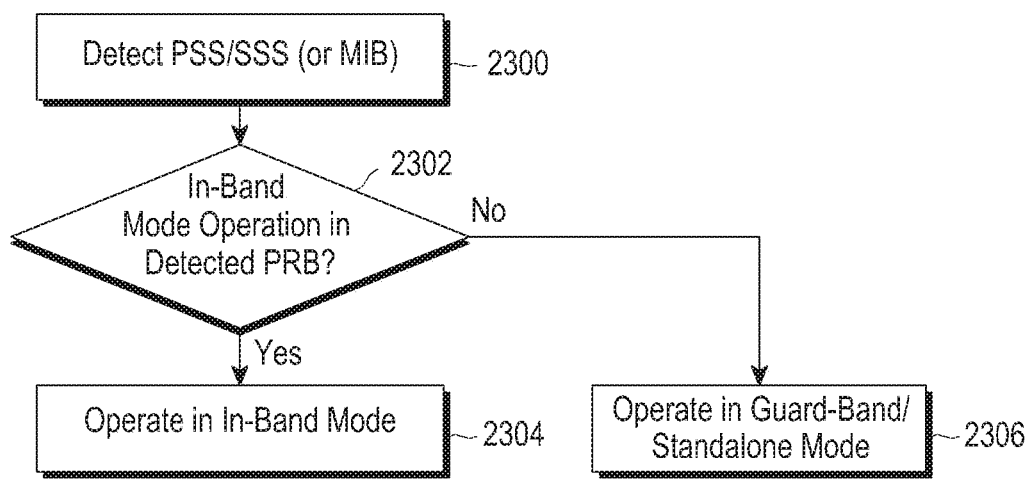
FIG. 23 is a flowchart illustrating a method for identifying a mode in an NB-IoT device.

FIG. 23 is a flowchart illustrating a method for identifying a mode in an NB-IoT device.

The NB-IoT device may detect an NB-PSS and an NB-SSS, or an NB-MIB (2300).

The device may determine an NB-IoT operation mode using the detected NB-PSS and NB-SSS, or the detected NB-MIB (2302). For example, a 1-bit mode indication may be embedded in the NB-MIB, and the device may determine from the 1-bit mode indication whether the current operation mode is the in-band mode or not. Then, the NB-IoT device may perform different processing according to the determined operation mode.

If the determined operation mode is the in-band operation mode, the device may operate in the in-band mode (2304). In the in-band operation mode, a predefined number of (for example, 3) LIE PDCCH symbols in one subframe may not be used by the NB-IoT system. If the determined operation mode is not the in-band operation mode, the device may operate in the guard-band mode or standalone mode (2306). In the guard-band mode or standalone mode, the constraint for the in-band mode is not imposed on processing.

Considering the features of different operation modes, the above options for mode indication are useful for appropriate subsequent processing because the options enable the NB-IoT system to distinguish NB-IoT operation modes from each other as fast as possible.

Figure 24:
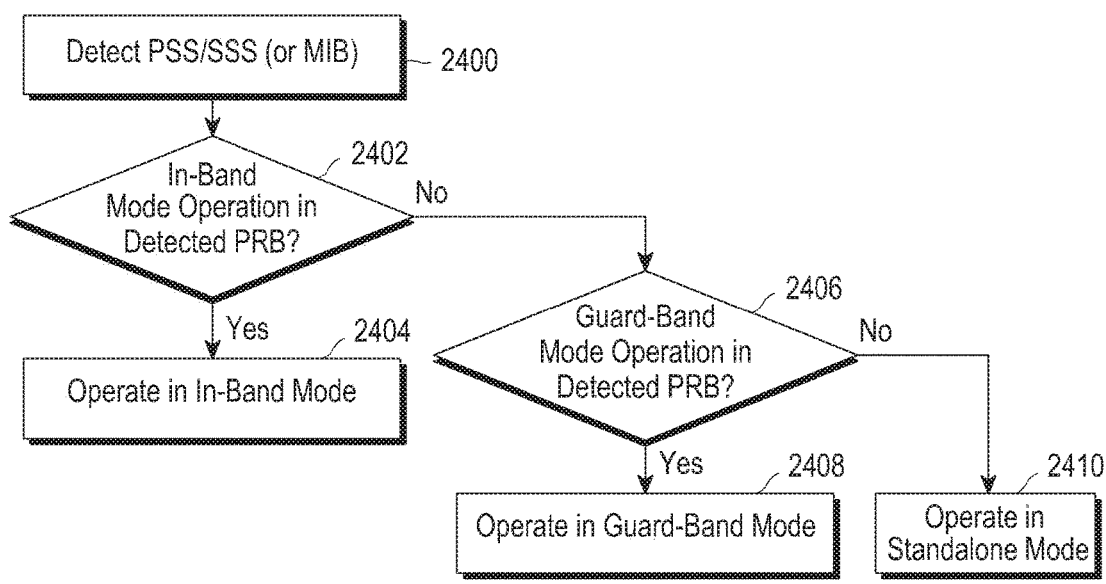
FIG. 24 is a flowchart illustrating another method for identifying a mode in an NB-IoT device.

FIG. 24 is a flowchart illustrating another method for identifying a mode in an NB-IoT device.

The NB-IoT device may detect an NB-PSS and an NB-SSS, or an NB-MIB (2400).

The device may determine an NB-IoT operation mode using the detected NB-PSS and NB-SSS, or the detected NB-MIB (2402 and 2406). For example, a 2-bit mode indication may be embedded in the NB-MIB, and the device may determine from the 2-bit mode indication whether the current operation mode is the in-band mode, the guard-band mode, or the standalone mode.

First, the device may determine whether the NB-IoT mode is the in-band mode (2402). If the determined NB-IoT mode is the in-band mode, the device may operate in the in-band mode (2404). In the in-band operation mode, a predefined number of (for example, 3) LTE PDCCH symbols in one subframe may not be used by the NB-IoT system. If the determined operation mode is not the in-band operation mode, the device may determine whether the NB-IoT operation mode is the guard-band mode (2406). If the determined operation mode is the guard-band operation mode, the device may operate in the guard-band mode (2408). If the determined operation mode is not the guard-band operation mode, the device may operate in the standalone mode (2410).

Figure 25:
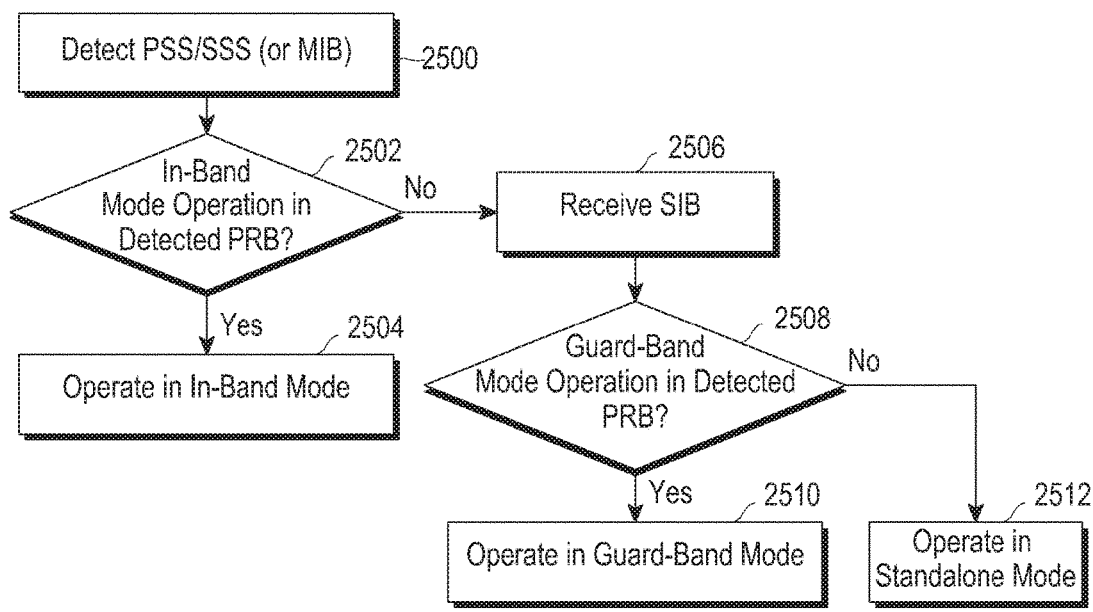
FIG. 25 is a flowchart illustrating another method for identifying a mode in an NB-IoT device.

FIG. 25 is a flowchart illustrating another method for identifying a mode in an NB-IoT device.

In FIG. 25, an MIB may just indicate whether an operation mode is the in-band mode or not. If the guard-band mode and the standalone mode need to be further distinguished, it may be determined whether the operation mode is the guard-band mode or the standalone mode by reception of an SIB (for example, SIB1).

The NB-IoT device may detect an NB-PSS and an NB-SSS, or an NB-MIB (2500).

The device may determine an NB-IoT operation mode using the detected NB-PSS and NB-SSS, or the detected NB-MIB (2502). For example, a 1-bit mode indication may be embedded in the NB-MIB, and the device may determine from the 1-bit mode indication whether the current operation mode is the in-band mode or not.

If the determined operation mode is the in-band operation mode, the device may operate in the in-band mode (2504). If the determined operation mode is not the in-band operation mode, the device may receive an SIB (2506).

The device may determine from the received SIB whether the NB-IoT operation mode is the guard-band mode (2508). If the determined operation mode is not the guard-band mode, the device may operate in the standalone mode (2512).

Figure 26:
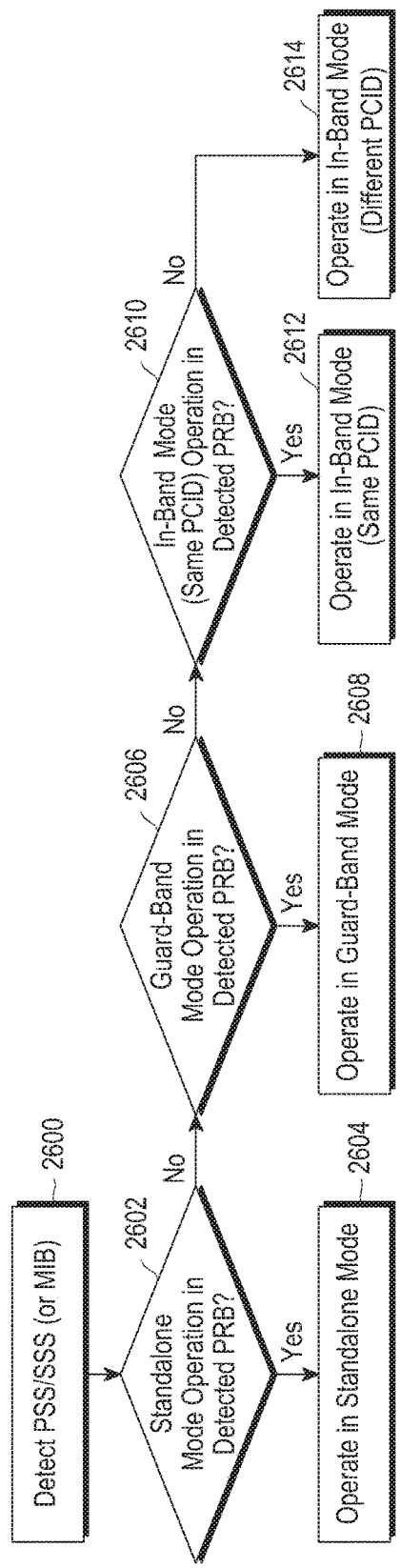
FIG. 26 is a flowchart illustrating another method for identifying a mode in an NB-IoT device.

FIG. 26 is a flowchart illustrating another method for identifying a mode in an NB-IoT device.

The mode differentiation method of FIG. 26 may be applied to the case where the NB-MIB mode indication field illustrated in FIG. 22 is used. An NB-IoT device may detect an NB-MIB, and then acquire operation mode information and related parameters (for example, channel information, CRS-related information, and so on) for further processing.

The NB-IoT device may detect an NB-PSS and an NB-SSS, or an NB-MIB (2600).

The device may determine an NB-IoT operation mode using the detected NB-PSS and NB-SSS, or the detected NB-MIB (2602). For example, the 1-bit mode indication 2200 may be embedded in the NB-MIB, and the device may determine from the 1-bit mode indication 2200 whether the current operation mode is the standalone mode (2602).

If the determined NB-IoT mode is the standalone mode, the device may operate in the standalone mode (2604). If the determined operation mode is not the standalone mode, the device may determine from the additional 1-bit mode indication 2202 whether the NB-IoT operation mode is the guard-band mode (2606). If the determined operation mode is the guard-band operation mode, the device may operate in the guard-band mode (2608). If the determined operation mode is not the guard-band operation mode, the device may determine whether the NB-IoT operation mode is the in-band mode and uses the same cell ID as that of the legacy system from the 1-bit mode indication 2200 and the additional 1-bit mode indication 2202 (2610). If the determined operation mode is the in-band mode with the same cell ID, the device may operate in the in-band mode (the same PCID) (2612). If the determined operation mode is the in-band mode but a different cell ID is used, the device may operate in the in-band mode (a different PCID) (2612).

F. Alternative Design of NB-IoT Frame Structure

Figure 27:
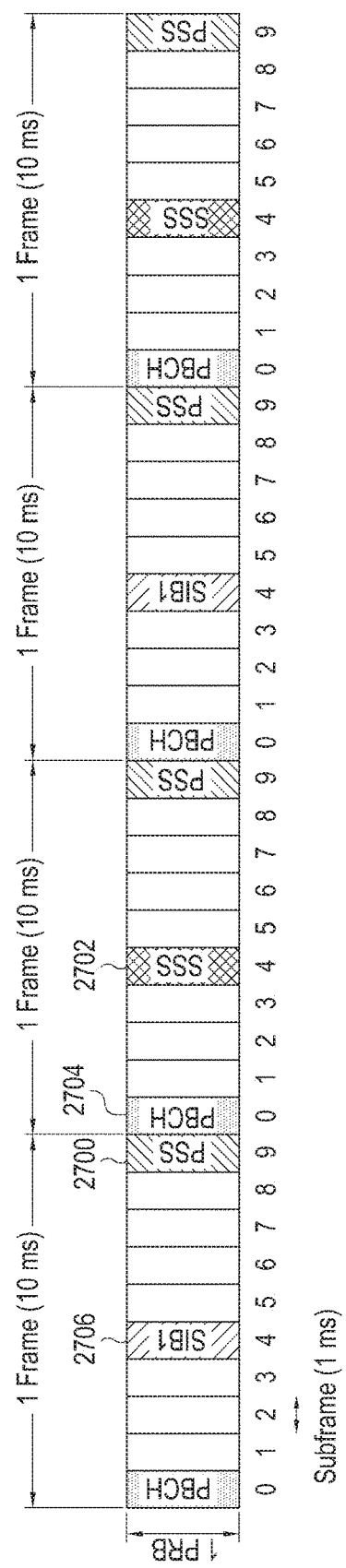
FIG. 27 is an exemplary view illustrating an alternative design of an NB-IoT downlink frame structure.

FIG. 27 is an exemplary view illustrating an alternative design of an NB-IoT downlink frame structure.

The alternative NB-IoT DL frame structure will be described. This structure is matched to an LTE system, for suitable in-band deployment. Considering the in-band mode, the NB-IoT frame structure mainly seeks not to affect legacy LIE UEs. Therefore, some REs need to be protected so that they may not be used for NB-LTE.

Therefore, it is preferable to allocate a PSS/SSS and a PBCH in a manner that avoids collision with a legacy LTE signal in resources. A PSS, an SSS, and an M-PBCH may be selected so as to avoid collision with an LTE CRS, PRS, PSS, SSS, PDCCH, PCFICH, PHICH, and MBSFN. For example, the LTE MBSFN may occur in subframes 1, 2, 3, 6, and 7. Herein, subframes 0, 4, 5 and 9 may be considered as the positions of the NB-IoT PSS/SSS and PBCH.

As illustrated in FIG. 27, the NB-IoT frame structure may be designed in the same manner as the LIE frame structure. A PSS 2700 may be positioned in subframe 9 and repeated every 10 ms in order to prevent potential collision with the MBSFN. An SSS 2702 may be positioned in subframe 4 and repeated every 20 ms. A PBCH 27204 may be positioned in subframe 9 and repeated every 10 ms. If there are dedicated resources for transmission of SIB1, SIB1 2706 may be positioned in subframe 4 that is not occupied by the SSS. Considering the afore-described rules to avoid collision with legacy L 1E, it is obvious that other positions are also available. The remaining resources except for resources used for transmission of the PBCH, PSS, SSS, and SIB1 may be shared by a control channel (for example, a PDCCH) or a data channel (for example, a PDSCH).

Figure 28:
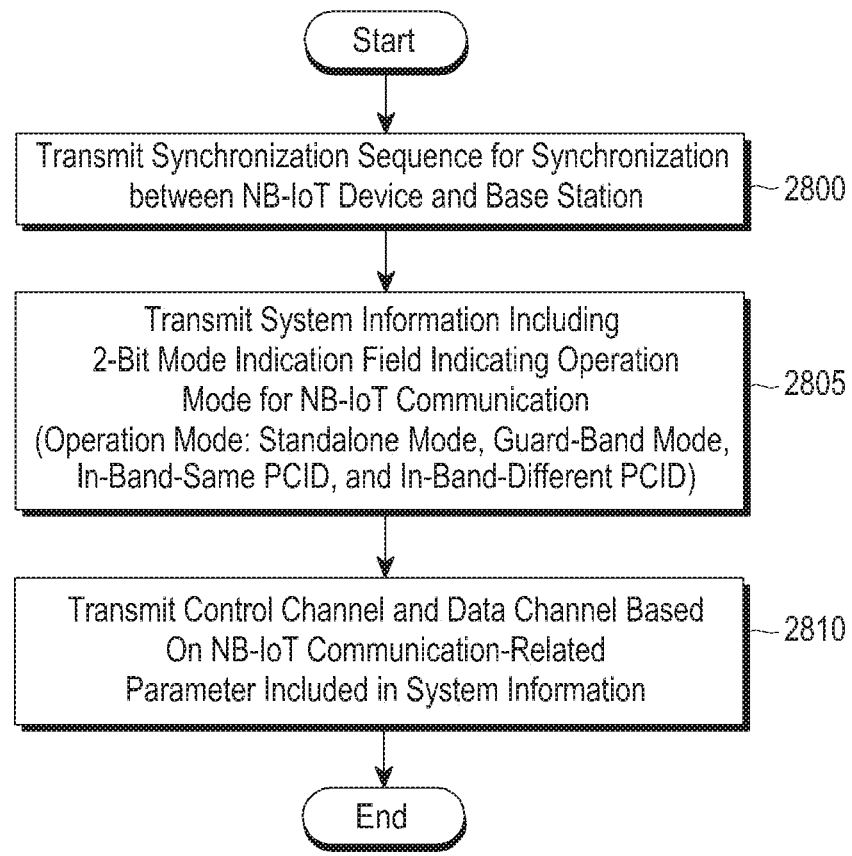
FIG. 28 is an exemplary view illustrating a method for supporting NB-IoT communication in a base station according to the present disclosure.

FIG. 28 is an exemplary view illustrating a method for supporting NB-IoT communication in a base station according to the present disclosure.

In a cellular system, a base station may transmit a synchronization sequence to an NB-IoT device so that the NB-IoT device may acquire synchronization with the base station (2800). The synchronization sequence may include a PSS and/or an SSS.

The base station may transmit system information including a 'mode indication' field indicating one operation mode to the NB-IoT device (2805). The mode indication field may include 2 bits. A first bit may indicate whether the operation mode is the in-band mode or not, and a second bit may indicate whether the operation mode is the guard-band mode or the device uses the same PCID as that of the legacy system. Operation modes that may be indicated by the mode indication field may include the standalone mode, the guard-band mode, the in-band mode-same PCID, and the in-band mode-different PCID. The system information may be an MIB transmitted on a PBCH. The MIB may include information about a transmission PRB index of the control channel or data channel. Payload of the MIB may further include information related to the in-band mode, for example, CRS-related information of the LTE system. Selectively, the MIB may be transmitted in an anchor PRB at a predefined position. Herein, the standalone mode is a mode in which the NB-IoT device operates within the bandwidth of another cellular system (for example, a GSM system), the guard-band mode is a mode in which the NB-IoT device operates within a guard band of the cellular system, and the in-band mode is a mode in which the NB-IoT device operates within the bandwidth of the cellular system.

The base station may transmit the control channel and/or the data channel based on parameters related to NB-IoT included in the system information (2810).

Figure 29:
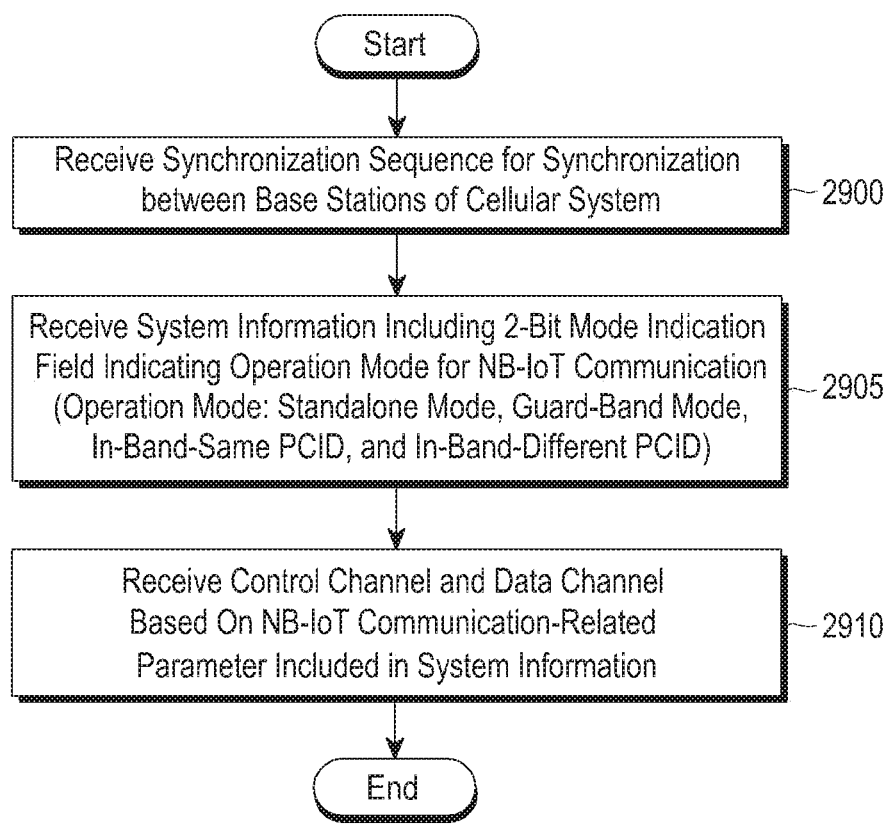
FIG. 29 is an exemplary view illustrating a method for conducting NB-IoT communication in a device according to the present disclosure.

FIG. 29 is an exemplary view illustrating a method for conducting NB-IoT communication in a device according to the present disclosure.

An NB-IoT device may receive a synchronization sequence from a base station of a cellular system so that the NB-IoT device may acquire synchronization with the base station (2900). The synchronization sequence may include a PSS and/or an SSS.

The device may receive, from the base station, system information including a 'mode indication' field indicating one operation mode to the NB-IoT device (2905). The mode indication field may include 2 bits. A first bit may indicate whether the operation mode is the in-band mode or not, and a second bit may indicate whether the operation mode is the guard-band mode or the device uses the same PCID as that of the legacy system. Operation modes that may be indicated by the mode indication field may include the standalone mode, the guard-band mode, the in-band mode-same PCID, and the in-band mode-different PCID. The system information may be an MIB transmitted on a PBCH. The MIB may include information about a transmission PRB index of the control channel or data channel. Payload of the MIB may further include information related to the in-band mode, for example, CRS-related information of the LTE system. Selectively, the MIB may be transmitted in an anchor PRB at a predefined position. Herein, the standalone mode is a mode in which the NB-IoT device operates within the bandwidth of another cellular system (for example, a GSM system), the guard-band mode is a mode in which the NB-IoT device operates within a guard band of the cellular system, and the in-band mode is a mode in which the NB-IoT device operates within the bandwidth of the cellular system.

The device may receive the control channel and/or the data channel based on parameters related to NB-IoT included in the system information (2910).

Figure 30:
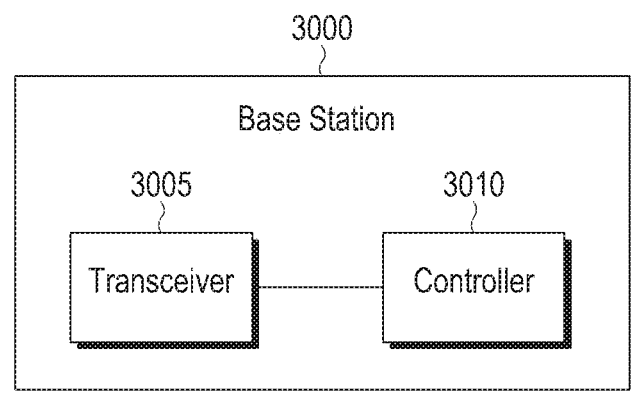
FIG. 30 is a block diagram of a base station according to the present disclosure.

FIG. 30 is a block diagram of a base station according to the present disclosure.

A base station 3000 may include a transceiver 3005 for transmitting and receiving signals to and from a device, and a controller 3010 for controlling overall operations of the base station 3000. All operations of the base station described above in the present disclosure may be understood as performed under the control of the controller 3010. However, the controller 3010 and the transceiver 3005 are not necessarily configured as separate devices. Rather, the controller 3010 and the transceiver 3005 may be integrated into one component in the form of a single chip.

Figure 31:
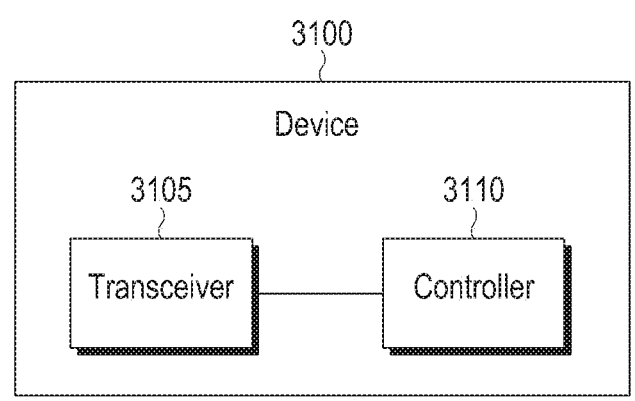
FIG. 31 is a block diagram of a device according to the present disclosure.

FIG. 31 is a block diagram of a device according to the present disclosure.

A device 3100 may include a transceiver 3105 for transmitting and receiving signals to and from a base station, and a controller 3110 for controlling overall operations of the device 3100. All operations of the device described above in the present disclosure may be understood as performed under the control of the controller 3110. However, the controller 3110 and the transceiver 3105 are not necessarily configured as separate devices. Rather, the controller 3110 and the transceiver 3105 may be integrated into one component in the form of a single chip.

It is to be noted that the configurations of transmission resources, the deployment methods, the mode indication methods, the device configurations, and so on illustrated in FIGS. 1 to 31 by way of example are not intended to limit the scope of the present disclosure. That is, all components or steps illustrated in FIGS. 1 to 31 should not be interpreted as mandatory components for implementation of the present disclosure, and the present disclosure may be implemented even with a part of the components without departing from the scope and spirit of the present disclosure.

The afore-described operations may be performed by providing a memory device storing a corresponding program code in a component of a base station, a device, or a terminal device in a communication system. That is, a controller of the base station, device, or terminal device may perform the afore-described operations by reading the program code stored in the memory by a processor or a central processing unit (CPU) and executing the program code.

Various components and modules of a base station, device, or terminal device described in the present disclosure may operate using hardware circuits such as a combination of a hardware circuit such as a complementary metal oxide semiconductor-based logic circuit, firmware, and software and/or hardware and firmware and/or software embedded in a machine-readable medium. For example, various electrical structures and methods may be implemented using electrical circuits such as transistors, logic gates, and ASICs.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The invention claimed is:

1. A method in a base station for supporting narrow band internet of things (IoT) communication of a device in a cellular system, the method comprising:
    transmitting, by the base station, a master information block (MIB) including operation mode information, the operation mode information indicating an operation mode for the narrow band IoT communication, and the operation mode corresponding to one of a plurality of operation modes; and
    transmitting, by the base station, a signal based on the operation mode indicated by the operation mode information,
    wherein the plurality of operation modes include a guard-band mode, an in-band mode and a standalone mode.

2. The method of claim 1, wherein the MIB is broadcast on a physical broadcast channel (PBCH).

3. The method of claim 1, wherein the operation mode information is included in a 2-bits mode indication field in the MIB, and whether the in-band mode is configured is indicated by a first bit of the 2-bits mode indication field.

4. The method of claim 3, wherein whether the guard-band mode is configured or whether a common cell identifier (ID) is used for the cellular system and the narrow band IoT communication is indicated by a second bit of the 2-bits mode indication field in the MIB.

5. The method of claim 1, wherein the MIB further includes additional information related to the operation mode of the narrow band IoT communication.

6. The method of claim 1, wherein the MIB further includes an index of a physical resource block (PRB) carrying the signal.

7. The method of claim 1, wherein the MIB is transmitted in an anchor physical resource block (PRB) at a predetermined position.

8. The method of claim 1, wherein the narrow band IoT communication is one of enhanced mobile broadband (eMBB) communication of a $5^{th}$ generation (5G) system, narrow band IoT (NB-IoT) communication of a long term evolution (LTE) system, or massive machine type communication (mMTC).

9. A base station for supporting narrow band internet of things (IoT) communication of a device in a cellular system, the base station comprising:
    a transceiver; and
    at least one processor coupled with the transceiver and configured to control the transceiver to:
        transmit a master information block (MIB) including operation mode information, the operation mode information indicating an operation mode for the narrow band IoT communication, and the operation mode corresponding to one of a plurality of operation modes, and
        transmit control information and data based on the operation mode indicated by the operation mode information,
    wherein the plurality of operation modes include a guard-band mode, an in-band mode and a standalone mode.

10. The base station of claim 9, wherein the MIB is broadcast on a physical broadcast channel (PBCH).

11. The base station of claim 10, wherein the operation mode information is included in a 2-bits mode indication field in the MIB, and whether the in-band mode is configured is indicated by a first bit of the 2-bits mode indication field.

12. An electronic device for performing narrow band internet of things (IoT) communication in a cellular system, the electronic device comprising:
    a transceiver; and
    at least one processor coupled with the transceiver and configured to control the transceiver to:
        receive a master information block (MIB) including operation mode information, the operation mode information indicating an operation mode for the narrow band IoT communication, and the operation mode corresponding to one of a plurality of operation modes, and
        receive control information and data based on the operation mode indicated by the operation mode information,
    wherein the plurality of operation modes include a guard-band mode, an in-band mode and a standalone mode.

13. The electronic device of claim 12, wherein the MIB is broadcast on a physical broadcast channel (PBCH).

14. The electronic device of claim 13, wherein the operation mode information is included in a 2-bits mode indication field in the MIB, and whether the in-band mode is configured is indicated by a first bit of the 2-bits mode indication field.

15. A method in an electronic device for performing narrow band internet of things (IoT) communication in a cellular system, the method comprising:
    receiving, by the electronic device, a master information block (MIB) including operation mode information, the operation mode information indicating an operation mode for the narrow band IoT communication, and the operation mode corresponding to one of a plurality of operation modes; and
    receiving, by the electronic device, a signal based on the operation mode indicated by the operation mode information,
    wherein the plurality of operation modes include a guard-band mode, an in-band mode and a standalone mode.

16. The method of claim 15, wherein the MIB is broadcast on a physical broadcast channel (PBCH).

17. The method of claim 15, wherein the operation mode information is included in a 2-bits mode indication field in the MIB, and whether the in-band mode is configured is indicated by a first bit of the 2-bits mode indication field.

18. The method of claim 17, wherein whether the guard-band mode is configured or whether a common cell identifier (ID) is used for the cellular system and the narrow band IoT communication is indicated by a second bit of the 2-bits mode indication field.

19. The method of claim 15, wherein the MIB further includes additional information related to the operation mode of the narrow band IoT communication.

20. The method of claim 15, wherein the MIB further includes an index of a physical resource block (PRB) carrying the signal.

* * * * *